US012217679B2

(12) United States Patent
Zhai et al.

(10) Patent No.: US 12,217,679 B2
(45) Date of Patent: Feb. 4, 2025

(54) DISPLAY PANEL AND DISPLAY DEVICE

(71) Applicant: TIANMA ADVANCED DISPLAY TECHNOLOGY INSTITUTE (XIAMEN) CO., LTD., Xiamen (CN)

(72) Inventors: Yingteng Zhai, Xiamen (CN); Xiaoxiang He, Xiamen (CN); Feng Qin, Shanghai (CN)

(73) Assignee: TIANMA ADVANCED DISPLAY TECHNOLOGY INSTITUTE (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 18/322,606

(22) Filed: May 24, 2023

(65) Prior Publication Data

US 2023/0317009 A1 Oct. 5, 2023

(30) Foreign Application Priority Data

Mar. 30, 2023 (CN) .......................... 202310327763.6

(51) Int. Cl.
*G09G 3/3233* (2016.01)
(52) U.S. Cl.
CPC ... *G09G 3/3233* (2013.01); *G09G 2300/0426* (2013.01); *G09G 2300/0814* (2013.01); *G09G 2310/0286* (2013.01); *G09G 2310/061* (2013.01); *G09G 2310/08* (2013.01)

(58) Field of Classification Search
None
See application file for complete search history.

(56) References Cited

U.S. PATENT DOCUMENTS

2023/0133179 A1* 5/2023 Lu .................. G09G 3/3233
345/206
2024/0087518 A1* 3/2024 He .................. G09G 3/3275

* cited by examiner

*Primary Examiner* — Matthew Yeung
(74) *Attorney, Agent, or Firm* — KILPATRICK TOWNSEND & STOCKTON LLP

(57) ABSTRACT

A display panel and a display device are provided. The display panel includes: a pixel circuit, a light-emitting element and an initialization signal line. The initialization signal includes an enabling level and a non-enabling level, and the enabling level of the initialization signal is configured to initialize a target node of the pixel circuit. The initialization signal line extends in a first direction, and includes a first initialization signal line and a second initialization signal line. The pixel circuit includes a first pixel circuit connected to the first initialization signal line and a second pixel circuit connected to the second initialization signal. A screen refresh cycle of the display panel includes a first stage, the first initialization signal line transmits the enabling level, and the second initialization signal line transmits the non-enabling level, in the first stage.

20 Claims, 23 Drawing Sheets

DISPLAY PANEL AND DISPLAY DEVICE

This application claims priority to Chinese Patent Application No. 202310327763.6, titled "DISPLAY PANEL AND DISPLAY DEVICE", filed on Mar. 30, 2023 with the China National Intellectual Property Administration, which is hereby incorporated by reference in its entirety.

FIELD

The present disclosure relates to the field of display technology, and more particularly, to a display panel and a display device.

BACKGROUND

With the development of the display technology, the display effect of the display panel has been continuously improving, which leads to increasing wide applications of the display panel. The display panel gradually evolves to the display panel with a high resolution and a high refresh rate.

Nevertheless, the duration of the screen refresh cycle (i.e., a time period of one frame) of the display panel is relatively long in the conventional technology, which makes it difficult to increase the refresh rate of the display panel.

SUMMARY

In view of this, a display panel and a display device are provided according to the present disclosure.

In one embodiment, a display panel is provided according to the present disclosure, the display panel includes a pixel circuit, a light-emitting element, and an initialization signal line. The pixel circuit is configured to drive the light-emitting element to emit light. The initialization signal line is configured to transmit an initialization signal, where the initialization signal includes an enabling level and a non-enabling level, and the enabling level of the initialization signal is configured to initialize a target node of the pixel circuit. The initialization signal line extends in a first direction, and includes a first initialization signal line and a second initialization signal line. The pixel circuit includes a first pixel circuit and a second pixel circuit. The first initialization signal line is electrically connected to the first pixel circuit, and the second initialization signal line is electrically connected to the second pixel circuit. The first pixel circuit and the second pixel circuit are arranged in a second direction, where the first direction intersects with the second direction. A screen refresh cycle of the display panel includes a first stage, where the first initialization signal line transmits the enabling level, and the second initialization signal line transmits the non-enabling level, in the first stage.

In one embodiment, a display device is provided according to the present disclosure, the display device includes a display panel. The display panel includes a pixel circuit, a light-emitting element, and an initialization signal line. The pixel circuit is configured to drive the light-emitting element to emit light. The initialization signal line is configured to transmit an initialization signal, where the initialization signal includes an enabling level and a non-enabling level, and the enabling level of the initialization signal is configured to initialize a target node of the pixel circuit. The initialization signal line extends in a first direction, and includes a first initialization signal line and a second initialization signal line. The pixel circuit includes a first pixel circuit and a second pixel circuit. The first initialization signal line is electrically connected to the first pixel circuit, and the second initialization signal line is electrically connected to the second pixel circuit. The first pixel circuit and the second pixel circuit are arranged in a second direction, where the first direction intersects with the second direction. A screen refresh cycle of the display panel includes a first stage, where the first initialization signal line transmits the enabling level, and the second initialization signal line transmits the non-enabling level, in the first stage.

BRIEF DESCRIPTION OF THE DRAWINGS

In order to more clearly explain the embodiments of the present disclosure, the drawings used in the description of the embodiments are briefly introduced hereinafter.

DETAILED DESCRIPTION OF EMBODIMENTS

Figure 1:
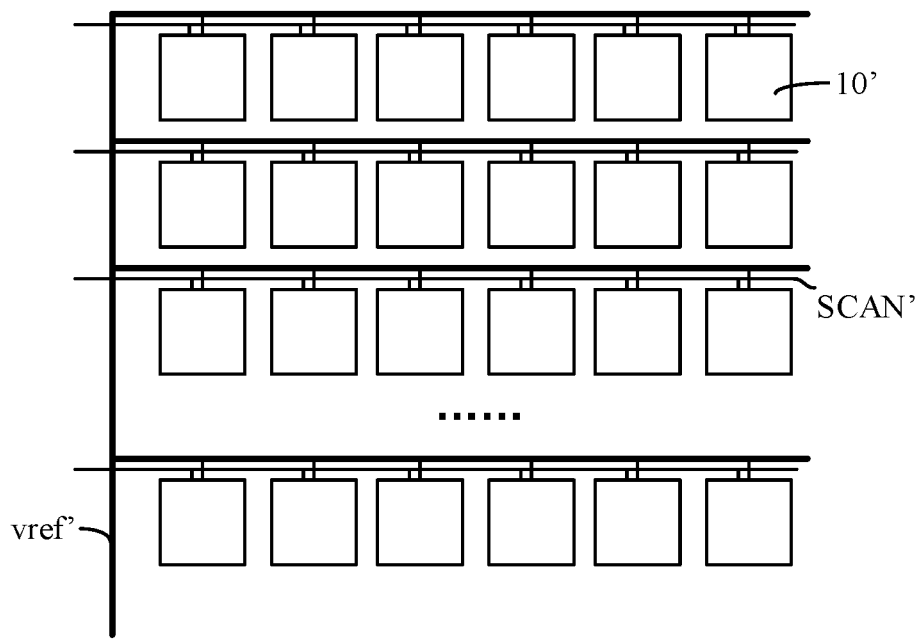
FIG. 1 is a schematic circuit diagram of a display panel.

The embodiments of the present disclosure will be described in detail below. Embodiments of the present disclosure will be further described in detail below in conjunction with the accompanying drawings and embodiments. It should be understood that the embodiments described here are only intended to explain the present disclosure rather than limit the present disclosure. Embodiments of the present disclosure can be implemented without some of these specific details. By providing examples of the present disclosure, the following description of the embodiments is only to provide a better understanding of the present disclosure.

It should also be noted that in this context, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Hence, a process, a method, an article or a device including a series of elements include not only the disclosed elements but also other elements that are not clearly enumerated, or further include inherent elements of the process, method, article or device. Unless expressively limited, the statement "including a . . . " does not exclude the case that other similar elements may exist in the process, method, article or device other than enumerated elements.

It should be understood that the term "and/or" used hereinafter is only an association relationship describing associated objects, which indicates that there may be three relationships. For example, A and/or B, which may indicate that A exists alone, both A and B exist, and B exists alone. In addition, the character "/" in this context generally indicates that the contextual objects are an "or" relationship.

It should be noted that the transistors in the present disclosure may be N-type transistors or P-type transistors. For N-type transistors, an enabling level is a high level, and a non-enabling level is a low level. In other words, when a gate of the N-type transistor is at a high level, a first electrode and a second electrode of the N-type transistor are connected, and when the gate of the N-type transistor is at a low level, the first electrode and the second electrode of the N-type transistor are disconnected. For a P-type transistor, the enabling level is a low level, and the non-enabling level is a high level. In other words, when a control electrode of the P-type transistor is at a low level, a first electrode and a second electrode of the P-type transistor are connected, and when the control electrode of the P-type transistor is at a high level, the first electrode and the second electrode of the P-type transistor are disconnected. In implementation, the gate of each above transistor is used as the control electrode of the transistor. According to the signal at the gate of the transistor and the type of the transistor, the first electrode may be used as a source, the second electrode may be used as a drain, or the first electrode is used as the drain, and the second electrode is used as the source, no distinction will be made hereinafter.

In the present disclosure, the term "electrically connected" may refer to a direct electrical connection between two components, or may refer to an electrical connection between two components via one or more other components.

In the present disclosure, the first node, the second node, the third node and each connection node are defined for the convenience of describing the circuit structure, and are not actual circuit units.

Various modifications and variations can be made in the present disclosure without departing from the spirit or scope of present disclosure. Hence, it is intended to cover the modifications and variations of the present disclosure falling within the scope of the corresponding claims and their equivalents. It should be noted that, the implementation provided in the present disclosure can be combined with each other if there is no contradiction.

Before elaborating the embodiments of the present disclosure, in order to facilitate the understanding of the present disclosure, the problems existing in the conventional technologies will be first specifically explain in the present disclosure below.

FIG. 1 is a schematic circuit diagram of a display panel. As shown in FIG. 1, in the conventional technologies, the pixel circuit 10' in the display panel is electrically connected to the scanning signal line SCAN' and the initialization signal line vref'. The scanning signal line SCAN' is used to provide a scanning signal to the pixel circuit 10', and the scanning signal can be used to control turn-on/off of transistors in the pixel circuit 10'. In one embodiment, multiple rows of pixel circuits 10' in the display panel usually share the same initialization signal line vref', which provides initialization signals for multiple rows of pixel circuits 10'.

Figure 2:
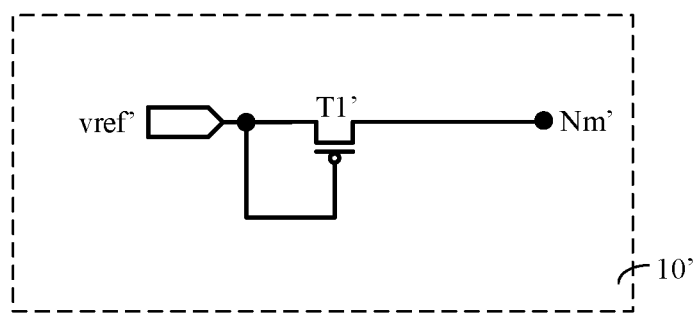
FIG. 2 is a schematic circuit diagram of a pixel circuit.

FIG. 2 is a schematic circuit diagram of a pixel circuit. As shown in FIG. 2, the pixel circuit 10' may include an initialization transistor T1'. In order to reduce the number of scanning signal lines in the display panel, it is firstly considered that a gate of the initialization transistor T1' and a first electrode of the initialization transistor T1' are both electrically connected to the initialization signal line vref', and a second electrode of the initialization transistor T1' is electrically connected to a target node Nm' in the pixel circuit 10' in the present disclosure. When the initialization signal line vref' transmits the enabling level, the initialization transistor T1' is turned on, and transmits the enabling level of the initialization signal line vref' to the target node Nm' in the pixel circuit 10', and to initialize the target node Nm'.

In other words, the enabling level provided by the initialization signal line vref' is not only used to turn on the initialization transistor T1', but also used to initialize the target node Nm'. However, after further research, the embodiments of the present disclosure found that, in this way, when the pixel circuits in the i-th row are in the data writing stage or the light-emitting stage, other pixel circuits except the pixel circuits in the i-th row cannot be initialized. If other pixel circuits except the pixel circuits in the i-th row are to be initialized, the initialization transistors T1' in the pixel circuits in the i-th row are turned on, that is, the pixel circuits in the i-th row are initialized, which affects the data signal writing of the pixel circuits in the i-th row and normal driving of the light-emitting elements by the pixel circuits in the i-th row. i in the above is a positive integer.

For better understanding, description will be made below in conjunction with FIG. 3.

Figure 3:
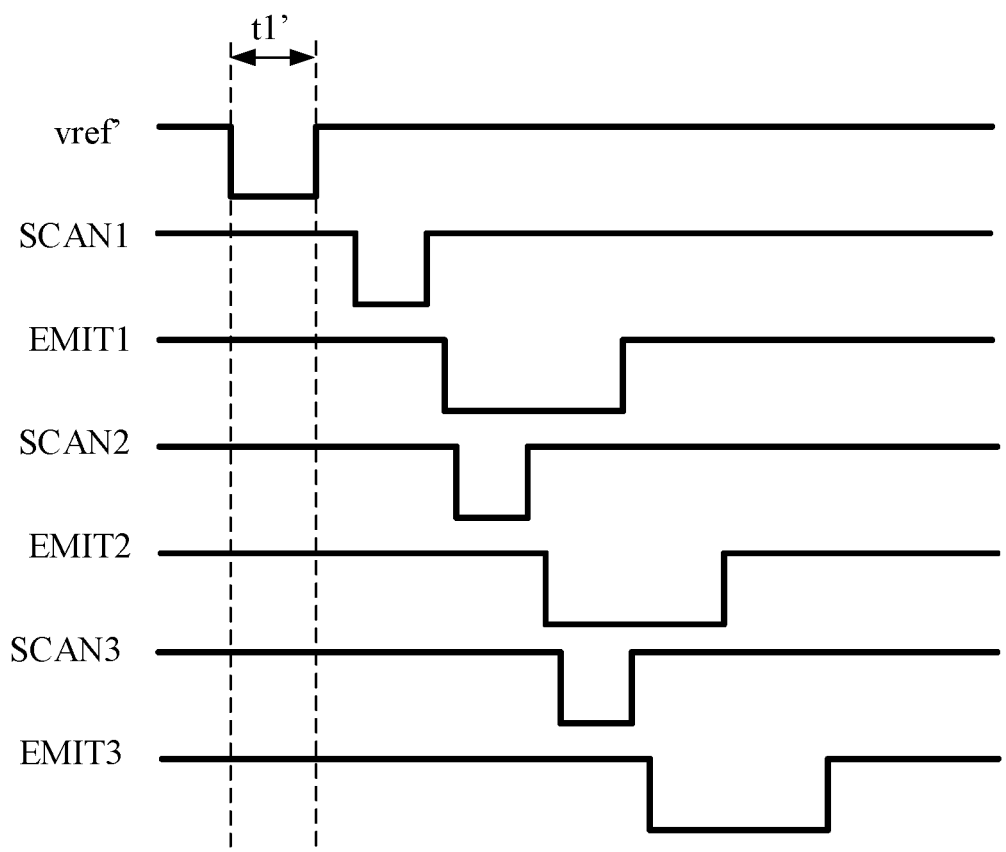
FIG. 3 is a timing diagram showing a driving timing corresponding to the display panel shown in FIG. 1.

FIG. 3 is a timing diagram showing a driving timing corresponding to the display panel. As shown in FIG. 3, taking 3 rows of pixel circuits as an example, when the pixel circuits in a j-th row are in the data writing stage, the scanning signal line SCANj corresponding to the pixel circuits in the j-th row outputs an enabling level (such as a low level), j is a positive integer. When the pixel circuits in the j-th row are in the light-emitting stage, the light-emitting control signal line EMITj corresponding to the pixel circuits in the j-th row outputs an enabling level (such as a low level). For example, when the pixel circuits in the first row are in the light-emitting stage, the light-emitting control signal line EMIT1 corresponding to the pixel circuits in the first row outputs an enabling level. When the pixel circuits in the second row are in the light-emitting stage, the light-emitting control signal line EMIT2 corresponding to the pixel circuits in the second row outputs an enabling level. When the pixel circuits in the third row is in the light-emitting stage, the light-emitting control signal line EMIT3 corresponding to the pixel circuits in the third row outputs an enabling level.

Referring to FIGS. 1 and 3, when using the circuit connections as shown in FIG. 1, in the t1' stage, the initialization signal line vref' needs to provide the enabling level of the initialization signal to multiple rows of pixel circuits 10' simultaneously, and multiple rows of pixel circuits 10' complete the initializations simultaneously. Then, the multiple rows of pixel circuits 10' sequentially perform the writing of data signals and drive the light-emitting elements to emit light. Since the pixel circuits in the i-th row are in the data writing stage or the light-emitting stage, other pixel circuits except the pixel circuits in the i-th row cannot be initialized. Hence, it has to wait for the pixel circuits 10' in the last row to complete the light-emitting stage before proceeding with the initialization process of the next frame, that is, to start the next frame, thus resulting in a relatively long duration of the screen refresh cycle (i.e., a time period of one frame) of the display panel, which further makes it difficult to increase the refresh rate of the display panel.

In view of the embodiments, in order to further increase the refresh rate, an embodiments of shifting the initialization signal is provided in the present disclosure, which is applicable to but is not limited to the scenario where the gate of the initialization transistor and the first electrode of the initialization transistor are both electrically connected to the initialization signal line. Hence, the embodiment of the present disclosure can solve the problem that the refresh rate of the display panel is difficult to increase due to the relatively long duration of the screen refresh cycle of the display panel.

The embodiments of the present disclosure is: for a first pixel circuit and a second pixel circuit in a display panel, a first initialization signal line is electrically connected to the first pixel circuit, a second initialization signal line is electrically connected to the second pixel circuit; the first initialization signal line provides the first pixel circuit with an enabling level for initializing a target node of the first pixel circuit, and the second initialization signal line provides the second pixel circuit with a non-enabling level, in a first stage of a screen refresh cycle of the display panel. In this way, there is no need to simultaneously initialize different pixel circuits, rather, the initialization processes can be performed separately. Therefore, for each pixel circuit, initialization can be performed without waiting for other pixel circuits to complete the light-emitting stage. In other words, the initialization process of the pixel circuit can overlap with the data writing stage and/or light-emitting stage of other pixel circuits, to shorten the duration of the screen refresh cycle of the display panel, which is beneficial to improve the refresh rate of the display panel.

The display panel according to the present disclosure will be described below.

Figure 4:
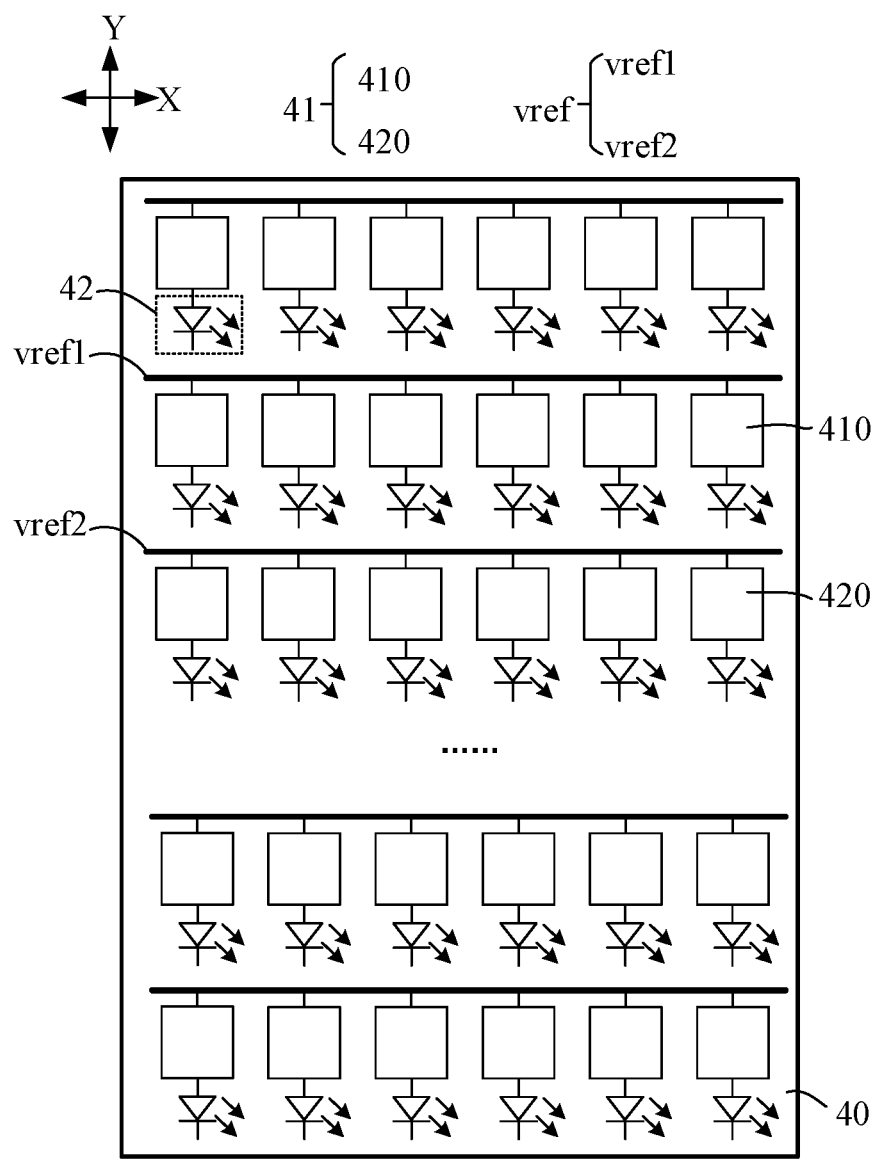
FIG. 4 is a schematic circuit diagram of a display panel according to an embodiment of the present disclosure.

FIG. 4 is a schematic circuit diagram of a display panel according to an embodiment of the present disclosure. As shown in FIG. 4, a display panel 40 may include a pixel circuit 41 and a light-emitting element 42. The pixel circuit 41 may be configured to drive the light-emitting element 42 to emit light. In an embodiment, the light-emitting element 42 includes but is not limited to an organic light-emitting diode (OLED), an inorganic light-emitting diode (LED) or a quantum dot (QD). The inorganic light-emitting diode includes but is not limited to a millimeter/submillimeter light-emitting diode (mini LED), a micro light-emitting diode (micro LED) or a quantum dot light-emitting diode (QLED).

The display panel 40 may include an initialization signal line vref electrically connected to the pixel circuit 41, and the initialization signal line vref is configured to transmit an initialization signal. The initialization signal may include an enabling level and a non-enabling level. The enabling level of the initialization signal may be used to initialize a target node of the pixel circuit 41. The enabling level and the non-enabling level of the initialization signal will be described with reference to FIG. 5 in the following.

The initialization signal line vref may extend in a first direction X. The initialization signal line vref may include a first initialization signal line vref1 and a second initialization signal line vref2. The pixel circuit 41 may include a first pixel circuit 410 and a second pixel circuit 420. The first pixel circuit 410 and the second pixel circuit 420 may be arranged in a second direction Y. The first direction X intersects with the second direction Y. In an embodiment, the first direction X may be a row direction of the display panel, and the second direction Y may be the column direction of the display panel. That is, it is to be understood that the first pixel circuit 410 and the second pixel circuit 420 are in different rows. It should be noted that the first pixel circuit 410 may be adjacent to the second pixel circuit 420 in the second direction Y, that is, there is no pixel circuit between the first pixel circuit 410 and the second pixel circuit 420. In one embodiment, the first pixel circuit 410 and the second pixel circuit 420 may not be adjacent in the second direction Y, that is, there may be one or more pixel circuits between the first pixel circuit 410 and the second pixel circuit 420.

The first initialization signal line vref1 is electrically connected to the first pixel circuit 410, and the second initialization signal line vref2 is electrically connected to the second pixel circuit 420. It should be noted that, the current vref1 and vref2 are only exemplary reference numerals, and are only used to illustrate that there are two initialization signal lines connected to different pixel rows on the display panel to transmit different initialization signals. The panel may include multiple initialization signal lines, where each initialization signal line is electrically connected to pixel circuits in a different row, and provides an initialization signal to the target nodes of the corresponding pixel circuits.

Figure 5:
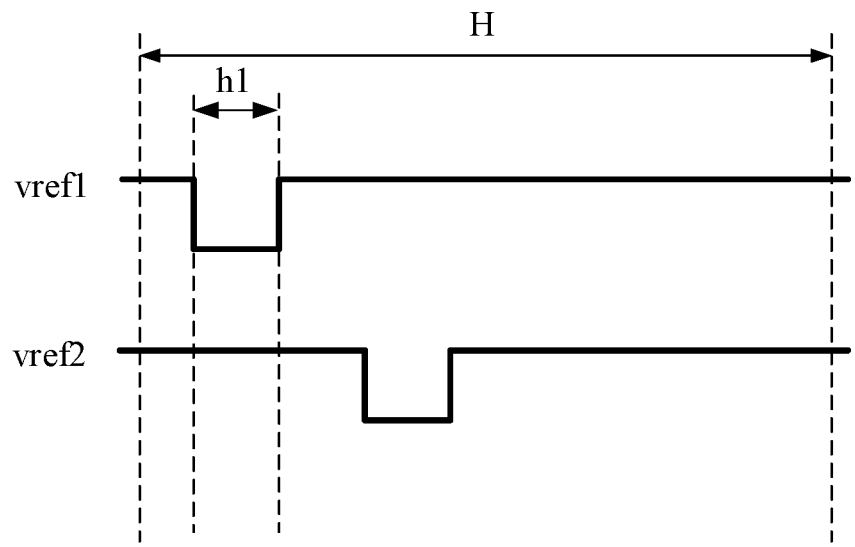
FIG. 5 is a timing diagram showing a driving timing corresponding to the display panel shown in FIG. 4.

FIG. 5 is a timing diagram showing a driving timing corresponding to the display panel shown in FIG. 4. As shown in FIG. 4 and FIG. 5, the enabling level of the initialization signal may be a low level, and the non-enabling level of the initialization signal may be a high level. Taking the first initialization signal line vref1 as an example, the first initialization signal line vref1 provides the enabling level of the initialization signal, to initialize the target node of the first pixel circuit 410. Further referring to FIG. 4 and FIG. 5, a screen refresh cycle H of the display panel may include a first stage h1. The screen refresh cycle H may be understood as a period during which the display panel displays one screen. In the screen refresh cycle H, multiple rows of pixel circuits of the display panel may drive corresponding light-emitting elements to light up row by row. The first stage h1 may be a partial time period of the screen refresh cycle H. In the first stage h1, the first initialization signal line vref1 transmits the enabling level, and the second initialization signal line vref2 transmits the non-enabling level. In other words, in the first stage h1, the first initialization signal line vref1 may provide the enabling level to the first pixel circuit 410 to initialize the target node of the first pixel circuit 410. During the first stage h1 of initializing the target node of the first pixel circuit 410, the second initialization signal line vref2 may provide the non-enabling level to the second pixel circuit 420, and the target node of the second pixel circuit 420 is not initialized. In this way, the initialization process of the first pixel circuit 410 and the initialization process of the second pixel circuit 420 may be performed separately in time.

It should be noted that, in FIG. 5, a case where the enabling level is the low level and the non-enabling level is the high level is described as an example for illustration, but in other embodiments, for example, when the thin-film transistor in the pixel circuit 41 is a N-type transistor, the enabling level may be a high level, and the non-enabling level may be a low level, which is not limited in the present disclosure.

In the display panel of the present disclosure, the first initialization signal line is electrically connected to the first pixel circuit, the second initialization signal line is electrically connected to the second pixel circuit; the first initialization signal line provides the first pixel circuit with the enabling level for initializing the target node of the first pixel circuit, and the second initialization signal line provides the second pixel circuit with the non-enabling level, in the first stage of the screen refresh cycle of the display panel. In this way, there is no need to simultaneously initializing different pixel circuits, rather, the initialization processes may be performed separately in different time periods. Therefore, for each pixel circuit, initialization may be performed without waiting for other pixel circuits to complete the light-emitting stage. In other words, the initialization process of the pixel circuit may overlap with the data writing stage and/or light-emitting stage of other pixel circuits, to shorten the duration of the screen refresh cycle of the display panel, which is beneficial to improve the refresh rate of the display panel.

Figure 6:
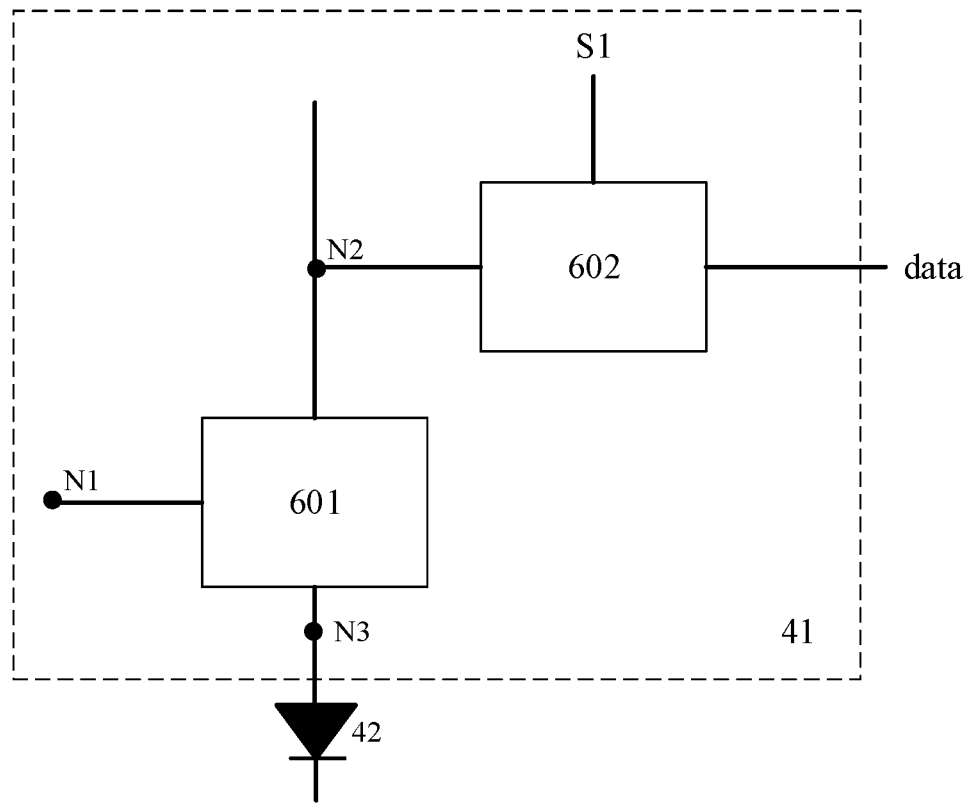
FIG. 6 is a schematic circuit diagram of a pixel circuit in a display panel according to an embodiment of the present disclosure.

FIG. 6 is a schematic circuit diagram of a pixel circuit in a display panel according to an embodiment of the present disclosure. As shown in FIG. 6, according to some embodiments of the present disclosure, the pixel circuit 41 may include a driving device 601 and a data writing device 602. A control terminal of the data writing device 602 is electrically connected to a first scanning line S1 which transmits a scanning signal. In some implementations, a control terminal of the driving device 601 may be electrically connected to a first node N1, a first terminal of the driving device 601 may be electrically connected to a second node N2, and a second terminal of the driving device 601 may be electrically connected to a third node N3. The driving device 601 may be configured to provide a driving current to the light-emitting element 42. A first terminal of the data writing device 602 may be electrically connected to a data signal line data, and a second terminal of the data writing device 602 may be electrically connected to the second node N2.

Figure 7:
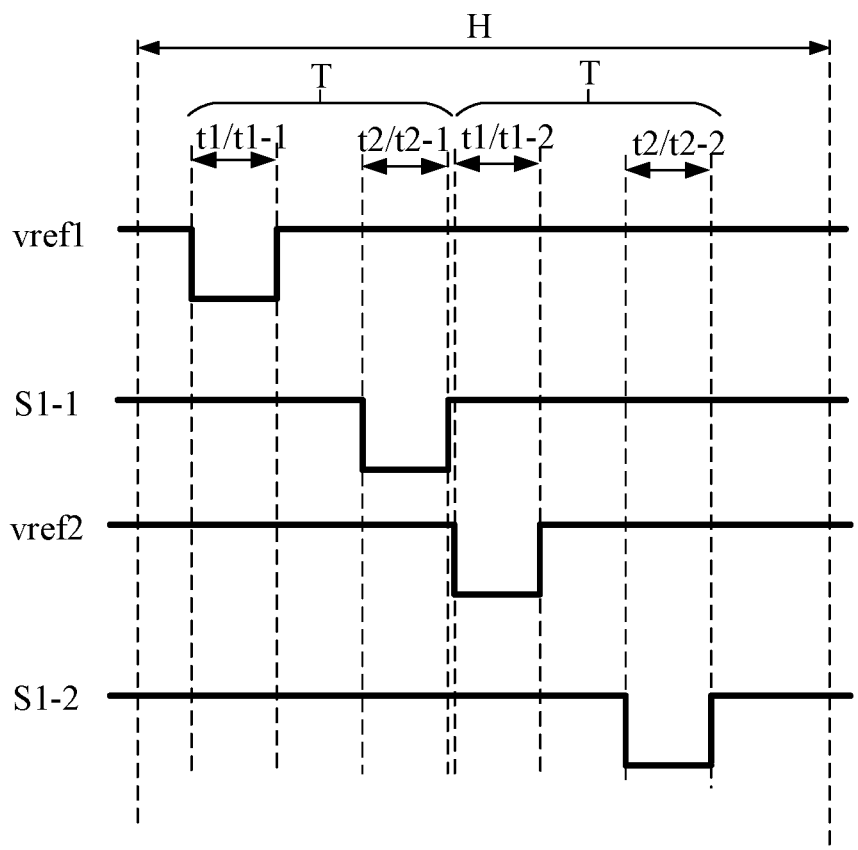
FIG. 7 is a timing diagram showing a driving timing corresponding to the pixel circuit shown in FIG. 6.

FIG. 7 is a s timing diagram showing a driving timing corresponding to the pixel circuit shown in FIG. 6. Referring to FIG. 6 and FIG. 7, a screen refresh cycle H of the display panel may include a light-emitting cycle T of at least one pixel circuit. The light-emitting cycle T of the pixel circuit may include an initialization stage t1 and a data writing stage t2. In the data writing stage t2, the data writing device 602 may provide a data signal to the driving device 601 in response to the first scanning signal. In an embodiment, in the data writing stage t2, the data writing device 602 may be turned on under the control of the first scanning line S1, and transmit the data signal of the data signal line data to the second node N2, and to write the data signal into the driving device 601.

Further referring to FIG. 6 and FIG. 7, for ease of description, t1-1 represents the initialization stage t1 of the first pixel circuit 410, and t2-1 represents the data writing stage t2 of the first pixel circuit 410. S1-1 represents the first scanning line S1 connected to the data writing device 602 in the first pixel circuit 410, S1-2 represents the first scanning line S1 connected to the data writing device 602 in the second pixel circuit 420. In the initialization stage t1-1 of the first pixel circuit 410, the first initialization signal line vref1 may transmit an enabling level to initialize the target node of the first pixel circuit 410. The initialization stage t1-1 of the first pixel circuit 140 is the above-mentioned first stage h1. In the initialization stage t1-1 of the first pixel circuit 140, the second initialization signal line vref2 may provide a non-enabling level to the second pixel circuit 420, and the target node of the second pixel circuit 420 is not initialized.

In the data writing stage t2-1 of the first pixel circuit 410, the first initialization signal line vref1 may transmit a non-enabling level. The data writing device 602 in the first pixel circuit 410 may provide a data signal to the driving device 601 in response to the first scanning signal. That is, the first initialization signal line vref1 does not constantly output the enabling level, rather, the first initialization signal line vref1 switches between the enabling level and the non-enabling level. In other words, the initialization signal transmitted by the first initialization signal line vref1 is a pulse signal.

In the data writing stage t2-1 of the first pixel circuit 410, the first initialization signal line vref1 transmits the non-enabling level, and the first pixel circuit 140 is not initialized, to prevent the data signal writing from being affected by the initialization to ensure that the first pixel circuit 140 can write the data signal successively.

Further referring to FIG. 6 and FIG. 7, in some embodiments, the light-emitting cycle T of the pixel circuit may include an initialization stage t1 and a data writing stage t2. In the same light-emitting cycle T, the initialization stage t1 may be located before the data writing stage t2, that is, the initialization stage t1 is earlier than the data writing stage t2 in the same light-emitting cycle T. By initializing the pixel circuit 41 first, the potential of the target node in the pixel circuit 41 may reach the expected potential, ensuring that the data signal may be successfully written into the driving device 601.

Figure 8:
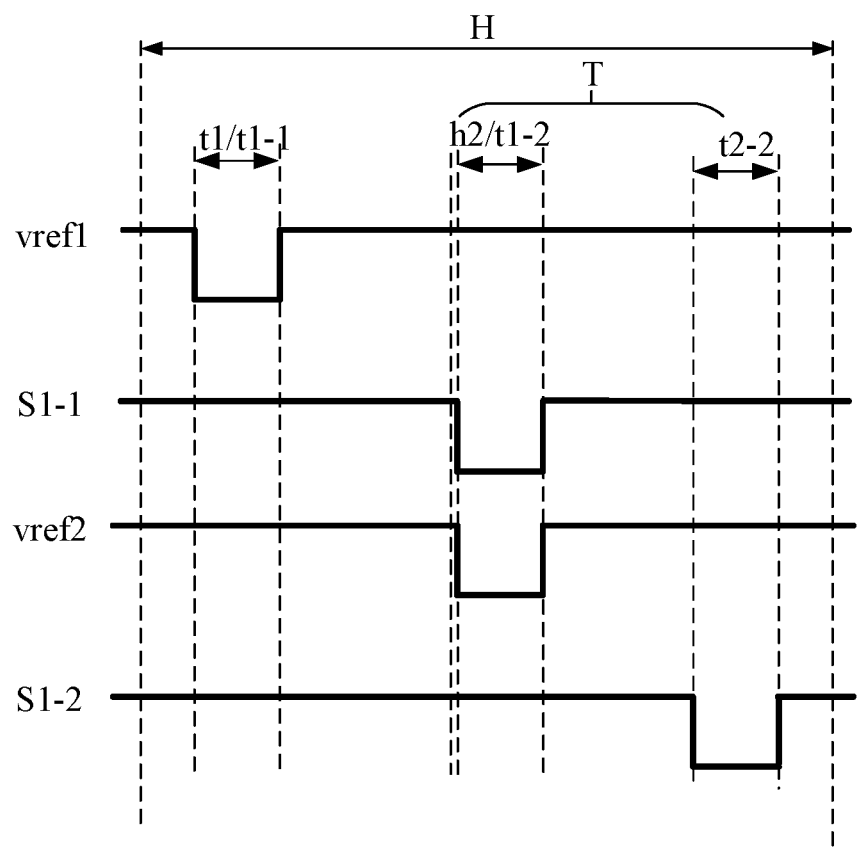
FIG. 8 is a timing diagram showing another driving timing corresponding to the display panel shown in FIG. 4.

FIG. 8 is a timing diagram showing another driving timing corresponding to the display panel shown in FIG. 4. Referring to FIG. 4 and FIG. 8, according to some embodiments of the present disclosure, the screen refresh cycle H of the display panel may further include a second stage h2. The second stage h2 may not be overlapped with the first stage h1, that is, the second stage h2 and the first stage h1 are different time periods. In the second stage h2, the first initialization signal line vref1 transmits the non-enabling level, and the second initialization signal line vref2 transmits the enabling level. In other words, in the second stage h2, the second initialization signal line vref2 may provide the enabling level to the second pixel circuit 420 to initialize the target node of the second pixel circuit 420. In the second stage h2 of initializing the target node of the second pixel circuit 420, the first initialization signal line vref1 may provide the non-enabling level to the first pixel circuit 410, and the target node of the first pixel circuit 410 is not initialized.

As described above, the first initialization signal line vref1 does not constantly output the enabling level, rather, the first initialization signal line vref1 may switch between the enabling level and the non-enabling level. Similarly, the second initialization signal line vref2 does not constantly output the non-enabling level, rather, the second initialization signal line vref2 may switch between the enabling level and the non-enabling level. In other words, both the initialization signal transmitted by the first initialization signal line vref1 and the initialization signal transmitted by the second initialization signal line vref2 may be pulse signals. As an implementation, a period of the initialization signal transmitted by the first initialization signal line vref1 may be the same as a period of the initialization signal transmitted by the second initialization signal line vref2. There is a phase difference between the initialization signal transmitted by the first initialization signal line vref1 and the initialization signal transmitted by the second initialization signal line vref2.

In this way, the initialization process of the first pixel circuit 410 and the initialization process of the second pixel circuit 420 may be performed separately in different time periods. Hence, the initialization process of the first pixel circuit 410 may overlap with the data writing stage and/or light-emitting stage of the second pixel circuit 420. In one embodiment, the initialization process of the second pixel circuit 420 may overlap with the data writing stage and/or light-emitting stage of the first pixel circuit 410, and the duration of the screen refresh cycle of the display panel can be shortened, and the refresh rate of the display panel can be improved.

As shown in FIG. 4, FIG. 6 and FIG. 8, for the convenience of description, t1-2 represents the initialization stage t1 of the second pixel circuit 420, and t2-2 represents the data writing stage t2 of the second pixel circuit 420. In some embodiments, in the initialization stage t1-2, i.e., the above second stage h2, corresponding to the second pixel circuit 420, the second initialization signal line vref2 provides the enabling level of the initialization signal, to initialize the target node of the second pixel circuit 420. At the same time, the data writing device 602 in the first pixel circuit 410 transmits the data signal to the driving device 601 in response to the first scanning signal. In other words, the data writing stage t2-1 of the first pixel circuit 410 and the initialization stage t1-2 of the second pixel circuit 420 may be overlapped.

In other words, the initialization process of the second pixel circuit 420 may be performed simultaneously with the data signal writing process of the first pixel circuit 410, to shorten the duration of one screen refresh cycle H of the display panel, which is beneficial to improve the refresh rate of the display panel.

Figure 9:
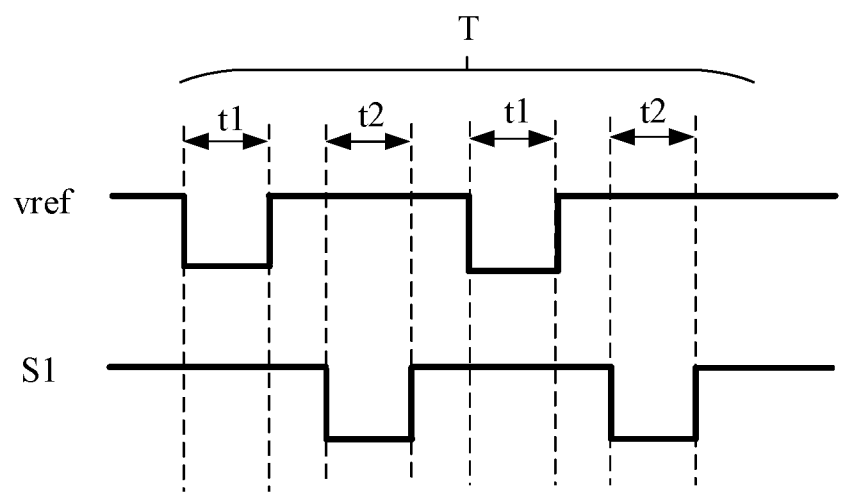
FIG. 9 is a timing diagram showing a driving timing corresponding to the pixel circuit shown in FIG. 6.

FIG. 9 is a timing diagram showing a driving timing corresponding to the pixel circuit shown in FIG. 6. Referring to FIG. 6 and FIG. 9, according to some embodiments of the present disclosure, a light-emitting cycle T of the pixel circuit 41 may include at least two initialization stages t1 and at least two data writing stages t2. The initialization stages t1 and the data writing stages t2 in the same light-emitting cycle T are alternately arranged. As shown in FIG. 9, a light-emitting cycle T including two initialization stages t1 and two data writing stages t2 is provided as an example for illustration. As shown in FIG. 9, in the order of time, the first initialization stage t1 may be located before the first data writing stage t2 in the same light-emitting cycle T, the first data writing stage t2 may be located before the second initialization stage t1, and the second initialization stage t1 may be located before the second data writing stage t2.

In this way, on the one hand, the pixel circuit 41 is initialized at least twice within one light-emitting cycle T to ensure that the potential of the target node in the pixel circuit 41 successfully reaches the expected potential, which is helpful to ensure the successful writing of data signals. On the other hand, the pixel circuit 41 writes data signals at least twice in one light-emitting cycle T, which is equivalent to adjusting the bias state of the threshold voltage of the driving device in the pixel circuit 41 at least twice, which is beneficial to recover the threshold voltage of the driving device in the pixel circuit 41.

Figure 10:
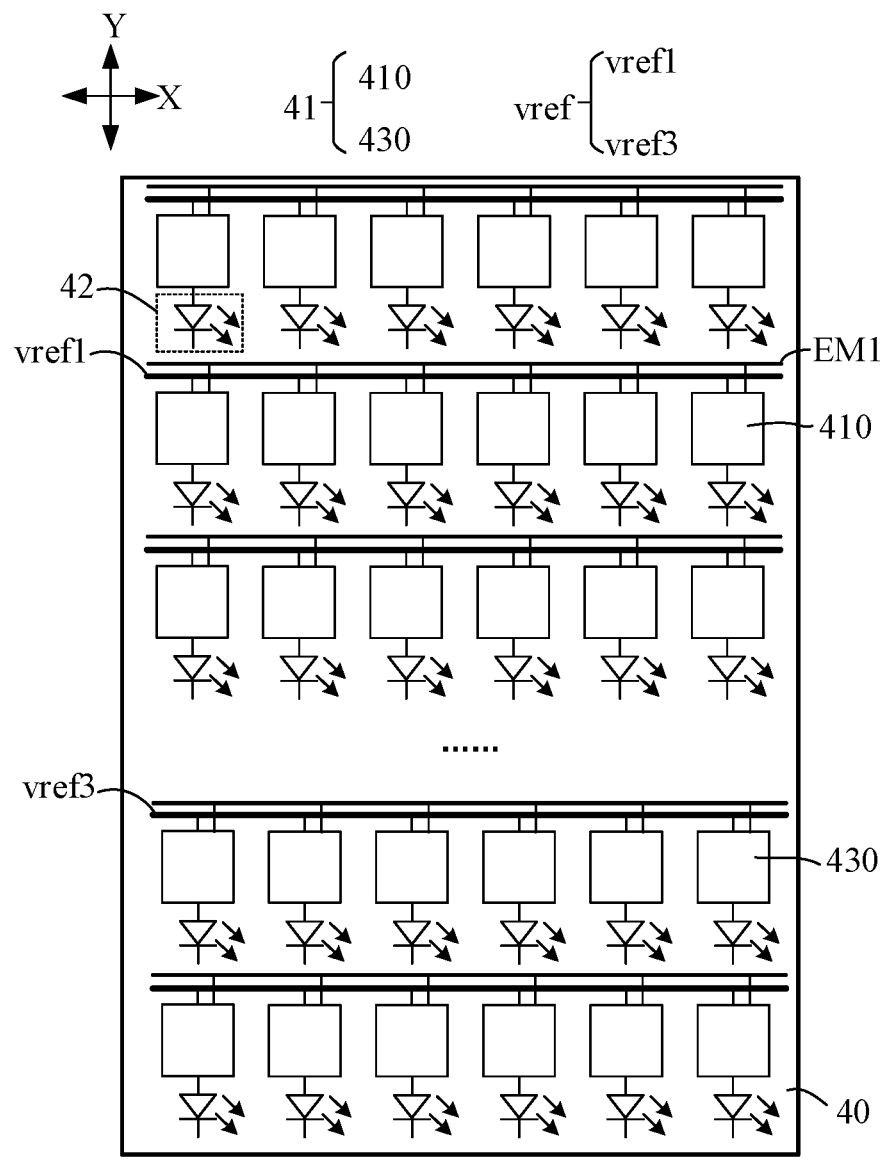
FIG. 10 is a schematic circuit diagram of a display panel according to another embodiment of the present disclosure.

FIG. 10 is a schematic diagram of a circuit of a display panel according to another embodiment of the present disclosure. As shown in FIG. 10, according to some embodiments of the present disclosure, the display panel 40 may further include a first light-emitting control signal line EM1, and the first light-emitting control signal line EM1 is electrically connected to the first pixel circuit 410. The first light-emitting control signal line EM1 may be configured to transmit a light-emitting control signal to the first pixel circuit 410. The light-emitting control signal may include an enabling level and a non-enabling level. When the first light-emitting control signal line EM1 transmits the enabling level to the first pixel circuit 410, the first pixel circuit 410 drives the light-emitting element 42 to emit light. The pixel circuit 41 may further include a third pixel circuit 430, and the third pixel circuit 430 and the first pixel circuit 410 may be arranged in the second direction Y. It should be noted that the positions of the first pixel circuit 410 and the third pixel circuit 430 shown in FIG. 10 are only exemplary. The first pixel circuit 410 and the third pixel circuit 430 may or may not be adjacent to each other in the second direction Y, which is not limited in the present disclosure. In addition, the third pixel circuit 430 may be the same as the second pixel circuit 420, or may be different from the second pixel circuit 420, which is not limited in the present disclosure.

The initialization signal line vref may further include a third initialization signal line vref3, and the third initialization signal line vref3 is electrically connected to the third pixel circuit 430.

Figure 11:
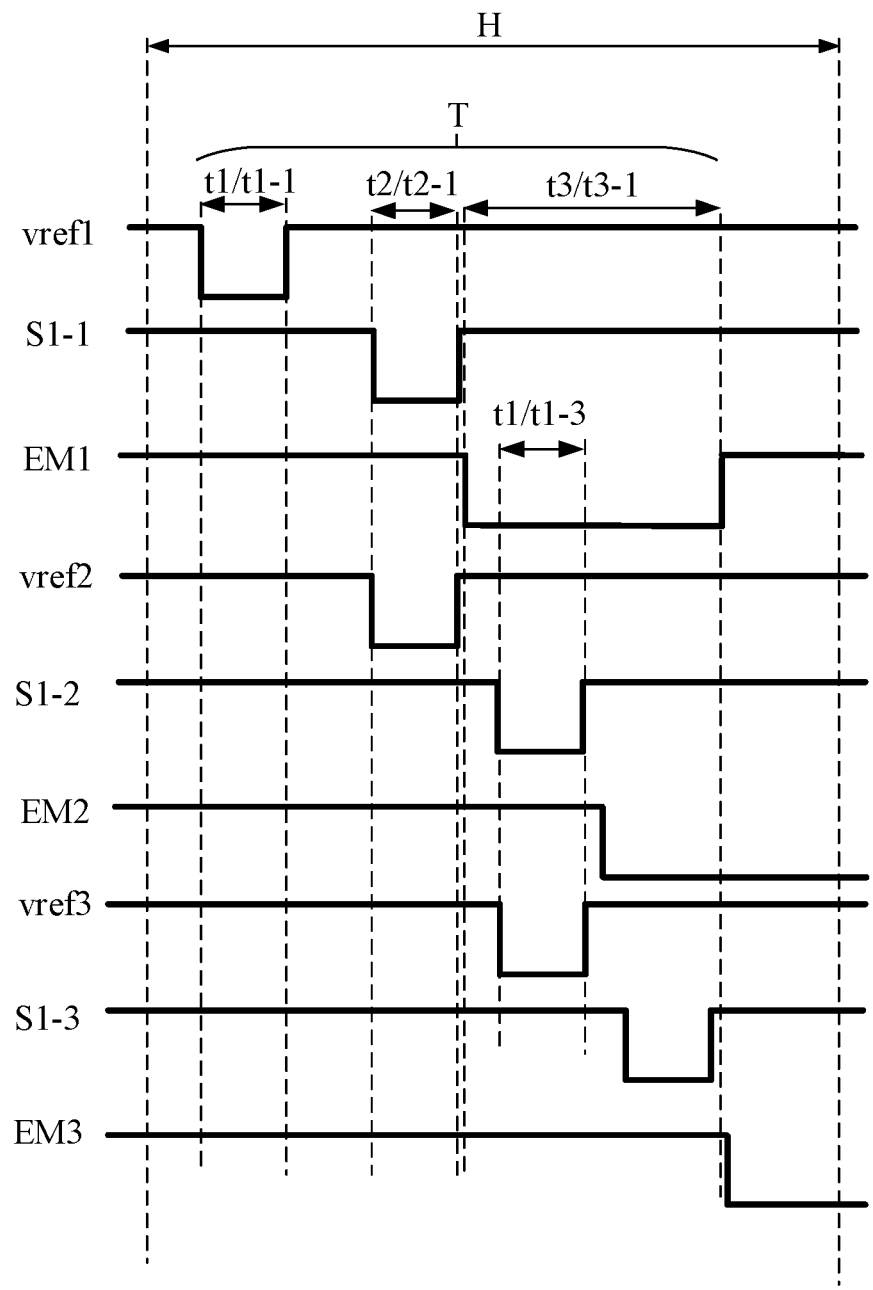
FIG. 11 is a timing diagram showing a driving timing corresponding to the display panel shown in FIG. 10.

FIG. 11 is a timing diagram showing a driving timing corresponding to the display panel shown in FIG. 10. As shown in FIG. 10 and FIG. 11, S1-1 represents a first scanning line S1 connected to the data writing device 602 in the first pixel circuit 410, S1-2 represents a first scanning line S1 connected to the data writing device 602 in the second pixel circuit 420, and S1-3 represents a first scanning line S1 connected to the data writing device 602 in the third pixel circuit 430. EM1 represents a first light-emitting control signal line connected to the first pixel circuit 410, EM2 represents a second light-emitting control signal line connected to the second pixel circuit 420, and EM3 represents a light-emitting control signal line connected to the third pixel circuit 430. The light-emitting cycle T of the pixel circuit may further include a light-emitting cycle t3, where t3-1 represents a light-emitting stage t3 of the first pixel circuit 410. In the light-emitting stage t3-1 of the first pixel circuit 410, the first light-emitting control signal line EM1 provides the enabling level, and the first pixel circuit 410 drives the light-emitting element 42 to emit light. At the same time, in the light-emitting stage t3-1 of the first pixel circuit 410, the third initialization signal line vref3 provides the enabling level of the initialization signal for initializing a target node of the third pixel circuit 430. In other words, when the first pixel circuit 410 is in the light-emitting stage t3-1, the third pixel circuit 430 may be initialized, and the initialization stage t1-3 of the third pixel circuit 430 may be at least partially overlapped with the light-emitting stage t3-1 of the first pixel circuit 410.

In this way, for example, for the third pixel circuit 430, initialization may be performed without waiting for other pixel circuits (such as the first pixel circuit 410) to complete the light-emitting stage, or in other words, the initialization process of the third pixel circuit 430 may be overlapped with the light-emitting stages of other pixel circuits, and the duration of the screen refresh cycle of the display panel can be shortened, which is beneficial to improve the refresh rate of the display panel.

Figure 12:
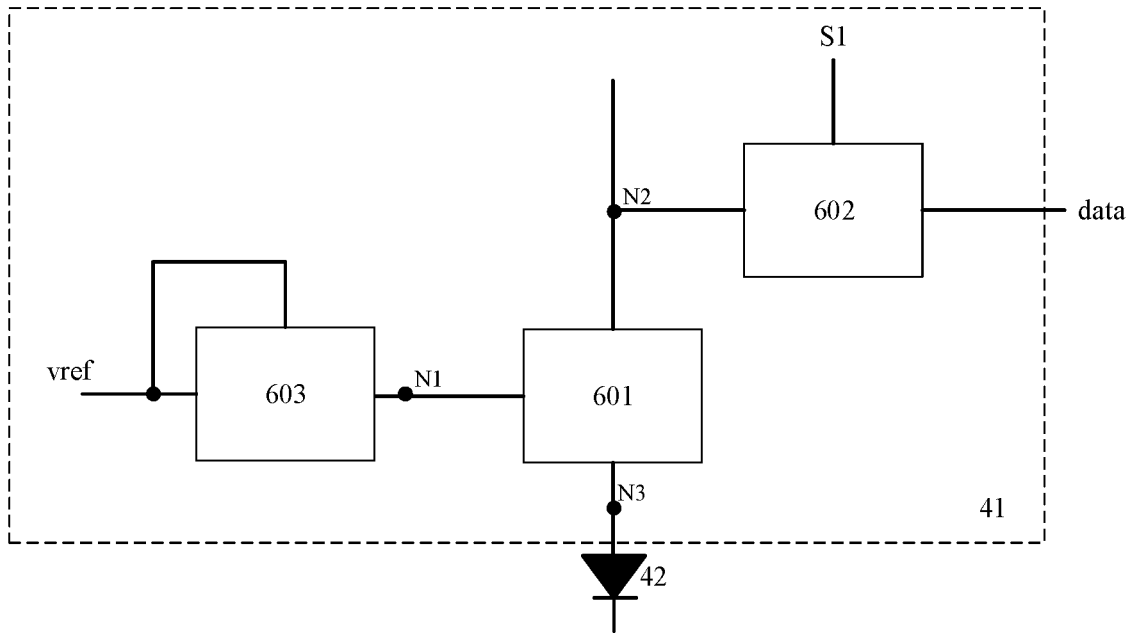
FIG. 12 is a schematic circuit diagram of a pixel circuit in a display panel according to another embodiment of the present disclosure.

FIG. 12 is a schematic circuit diagram of a pixel circuit in a display panel according to another embodiment of the present disclosure. As shown in FIG. 12, according to some embodiments of the present disclosure, the pixel circuit 41 may include a driving device 601 and a first initialization device 603. A control terminal of the driving device 601 may be electrically connected to a first node N1, a first terminal of the driving device 601 may be electrically connected to a second node N2, and a second terminal of the driving device 601 may be electrically connected to a third node N3. The target node of the aforementioned pixel circuit 41 may be the first node N1.

A control terminal of the first initialization device 603 may be electrically connected to the initialization signal line vref, a first terminal of the first initialization device 603 may be electrically connected to the initialization signal line vref, and a second terminal of the first initialization device 603 may be electrically connected to the first node N1. The first initialization device may be configured to transmit the enabling level of the initialization signal provided by the initialization signal line vref to the first node N1, to initialize the first node N1. By initializing the first node N1, subsequent data signals may be successfully written into the first node N1 (i.e., the control terminal of the driving device 601).

In this way, on the one hand, the control terminal of the first initialization device 603 and the first terminal of the first initialization device 603 are both electrically connected to the initialization signal line vref. The initialization signal line vref is used not only to provide the initialization signal for initializing the first node N1, but also to control the turn-on/off of the first initialization device 603, which can reduce the quantity of scanning signal lines in the display panel, facilitate wiring design and lower production costs.

On the other hand, taking the first pixel circuit and the second pixel circuit as an example, even though the control terminal of the first initialization device 603 and the first terminal of the first initialization device 603 are both electrically connected to the initialization signal line vref, the first initialization device 603 in the second pixel circuit may still be turned on, under the control of the second initialization signal line, to initialize the target node of the second pixel circuit when the first pixel circuit is in the data writing stage or the light-emitting stage. In this case, the first initialization device 603 in the first pixel circuit will not be affected by the second initialization signal line, and the first initialization device 603 in the first pixel circuit may be turned off under the control of the first initialization signal line, and not to affect the writing of the data signal of the first pixel circuit or driving the light-emitting element to emit light. Therefore, for the pixel circuit, the initialization of the first node N1 may be performed without waiting for other pixel circuits to complete the light-emitting stage, or in other words, the initialization process of the first node N1 may be overlapped with the data writing stages and/or the light-emitting stages of other pixel circuits, and the duration of the screen refresh cycle of the display panel can be shortened, and the refresh rate of the display panel can be improved.

Figure 13:
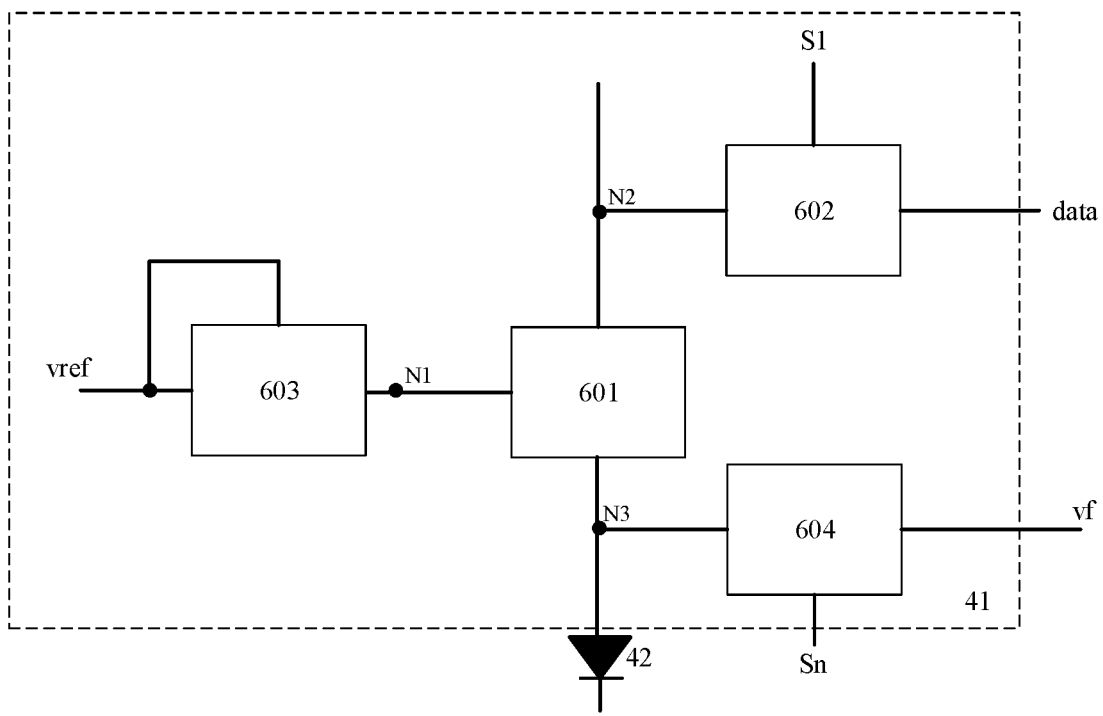
FIG. 13 is a schematic circuit diagram of a pixel circuit in a display panel according to yet another embodiment of the present disclosure.

FIG. 13 is a schematic circuit diagram of a pixel circuit in a display panel according to yet another embodiment of the present disclosure. As shown in FIG. 13, according to some embodiments of the present disclosure, the display panel 40 may further include a scanning signal line Sn and a reference voltage signal line vf, and the reference voltage signal line vf is configured to provide a constant voltage signal.

The pixel circuit 41 may further include a second initialization device 604, a control terminal of the second initialization device 604 is electrically connected to the scanning signal line Sn, and a first terminal of the second initialization device 604 is electrically connected to the reference voltage signal line vf, a second terminal of the second initialization device 604 is electrically connected to a first electrode of the light-emitting element 42. In an embodiment, the first electrode of the light-emitting element 42 may be an anode of the light-emitting element 42, and a second electrode of the light-emitting element 42 may be a cathode of the light-emitting element 42. The second initialization device 604 may be configured to transmit the voltage signal provided by the reference voltage signal line vf to the first electrode of the light-emitting element 42, and to initialize the first electrode of the light-emitting element 42.

Unless otherwise specified, the thin-film transistors in the pixel circuit 41 in the present disclosure are P-type transistors for illustration. When the thin-film transistors in the pixel circuit 41 are P-type transistors, the reference voltage signal line vf may be configured to provide a constant negative voltage signal, that is, a voltage signal having a voltage value less than 0V. The negative voltage signal provided by the reference voltage signal line vf is transmitted to the first electrode of the light-emitting element 42 through the second initialization device 604, to initialize the first electrode of the light-emitting element 42, and the potential of the first electrode of the light-emitting element 42 is pulled down to a lower potential.

In this way, by initializing the first electrode of the light-emitting element 42, the influence of the residual charge of the previous frame on the light-emitting element 42 may be avoided, to improve problems such as image retention.

According to some other embodiments of the present disclosure, similar to using a pulse signal to initialize the first node N1, the pulse signal may also be used to initialize the first electrode of the light-emitting element 42.

Figure 14:
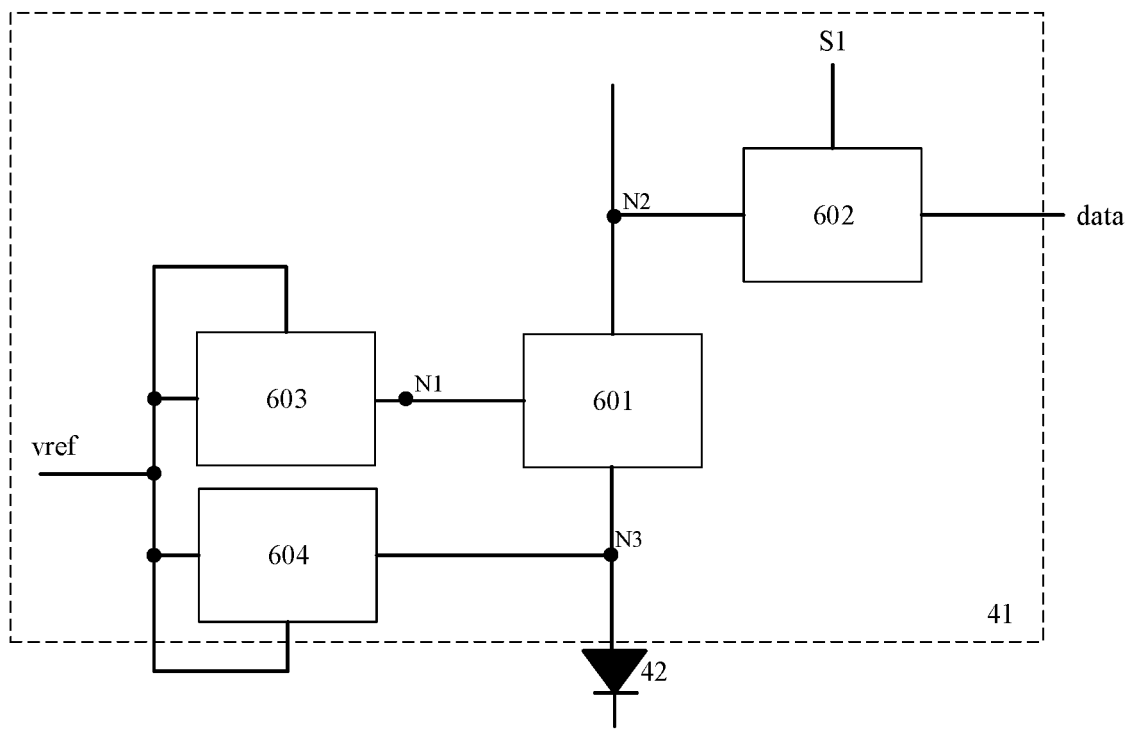
FIG. 14 is a schematic circuit diagram of a pixel circuit in a display panel according to yet another embodiment of the present disclosure.

FIG. 14 is a schematic circuit diagram of a pixel circuit in a display panel according to yet another embodiment of the present disclosure. As shown in FIG. 14, differing from the embodiment shown in FIG. 13, the control terminal of the second initialization device 604 may be electrically connected to the initialization signal line vref, the first terminal of the second initialization device 604 may also be electrically connected to the initialization signal line vref, and the second terminal of the second initialization device 604 may be electrically connected to the first electrode of the light-emitting element 42. The second initialization device 604 may be configured to transmit the enabling level of the initialization signal provided by the initialization signal line vref to the first electrode of the light-emitting element 42, to initialize the first electrode of the light-emitting element 42.

In other words, in the embodiment shown in FIG. 14, the initialization signal line vref is used not only to provide the initialization signal for initializing the first node N1, but also to control the turn-on/off of the first initialization device 603. In addition, the initialization signal line vref is used to provide an initialization signal for initializing the first electrode of the light-emitting element 42, and is further used to control the turn-on/off of second initialization device 604, In this way, the quantity of the scanning signal lines and/or reference voltage signal lines in the display panel can be further reduced, which is beneficial to simplify the wiring design and lower the production cost.

In addition, the initialization processes of first electrodes of light-emitting elements 42 of different pixel circuits may be performed separately in different time periods. For the pixel circuit, the first electrode of the light-emitting element 42 may be initialized without waiting for other pixel circuits to complete the light-emitting stage, or in other words, the initialization process of the first electrode of the light-emitting element 42 may overlap with the data writing stages and/or light-emitting stages of other pixel circuits, and the duration of the screen refresh cycle of the display panel can be shortened, which is beneficial to improve the refresh rate of the display panel.

In some embodiments, the first initialization device 603 and the second initialization device 604 in the same pixel circuit may be electrically connected to the same initialization signal line vref. In other words, the first initialization device 603 and the second initialization device 604 in the same pixel circuit may be electrically connected to the initialization signal line vref corresponding to the pixel circuits in the same row.

Figure 15:
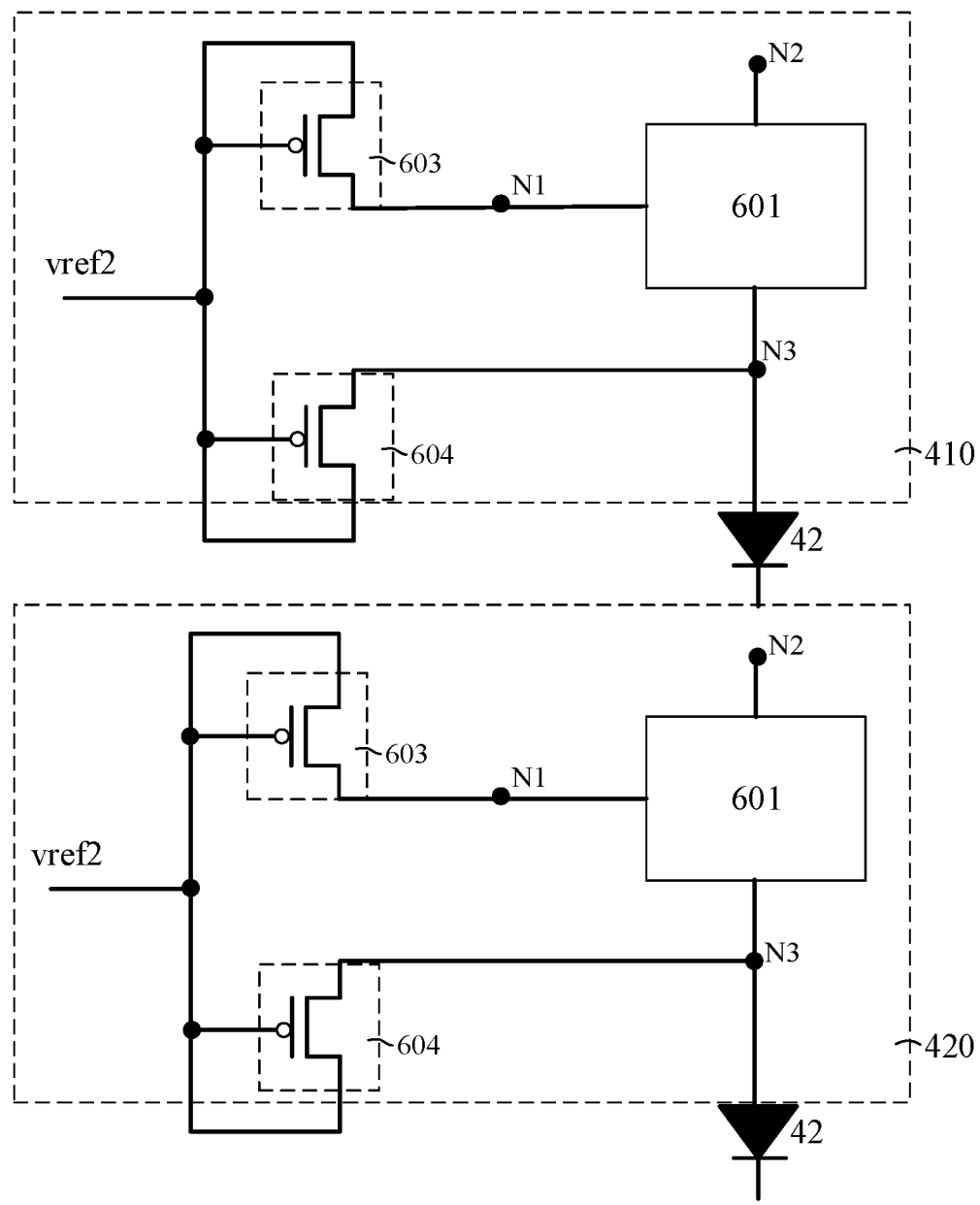
FIG. 15 is a schematic circuit diagram of a display panel according to yet another embodiment of the present disclosure.

FIG. 15 is a schematic circuit diagram of a display panel according to yet another embodiment of the present disclosure. As shown in FIG. 15, the control terminal of the first initialization device 603 in the first pixel circuit 410 and the control terminal of the second initialization device 604 in the first pixel circuit 410 may both be electrically connected to the first initialization signal line vref1. In addition, the first terminal of the first initialization device 603 in the first pixel circuit 410 and the first terminal of the second initialization device 604 in the first pixel circuit 410 may also be electrically connected to the first initialization signal line vref1. Both the first initialization device 603 and the second initialization device 604 are illustrated by taking P-type transistors as an example, yet the first initialization device 603 and the second initialization device 604 may also be N-type transistors, which is not limited in the embodiment of the present disclosure.

In this way, the initialization of the first node N1 in the first pixel circuit 410 and the initialization of the first electrode of the light-emitting element 42 connected to the first pixel circuit 410 may be performed simultaneously, for example, both in the initialization stage of the first pixel circuit 410. In addition, in wiring design, since the first initialization signal line vref1 is relatively close to the first pixel circuit 410, or in other words, the first initialization signal line vref1 passes through the area where the first pixel circuit 410 is located, the first initialization device 603 and the second initialization device 604 in the pixel circuit 410 are electrically connected to the first initialization signal line vref1, and connection lines between the first initialization device 603 and the first initialization signal line vref1, and/or connection lines between the second initialization device 604 and the first initialization signal line vref1 can be reduced, wiring in the display panel can be further reduced, and the wiring design can be simplified.

Similarly, both the control terminal of the first initialization device 603 in the second pixel circuit 420 and the control terminal of the second initialization device 604 in the second pixel circuit 420 may be electrically connected to the second initialization signal line vref2. In addition, the first terminal of the first initialization device 603 in the second pixel circuit 420 and the first terminal of the second initialization device 604 in the second pixel circuit 420 may also be electrically connected to the second initialization signal line vref2.

In this way, the initialization of the first node N1 in the second pixel circuit 420 and the initialization of the first electrode of the light-emitting element 42 connected to the second pixel circuit 420 may be performed simultaneously, for example, both in the initialization stage of the second pixel circuit 420. In addition, in wiring design, since the second initialization signal line vref2 is relatively close to the second pixel circuit 420, or in other words, the second initialization signal line vref2 passes through the area where the second pixel circuit 420 is located, the first initialization device 603 and the second initialization device 604 in the second pixel circuit 420 are electrically connected to the second initialization signal line vref2, and connection lines between the first initialization device 603 and the second initialization signal line vref2, and/or connection lines between the second initialization device 604 and the second initialization signal line vref2 can be reduced, wiring in the display panel can be further reduced, and the wiring design can be simplified.

In other embodiments, the first initialization device 603 and the second initialization device 604 in the same pixel circuit may be electrically connected to different initialization signal lines vref. In other words, the first initialization device 603 and the second initialization device 604 in the same pixel circuit may be electrically connected to initialization signal lines vref corresponding to different rows of pixel circuits.

Figure 16:
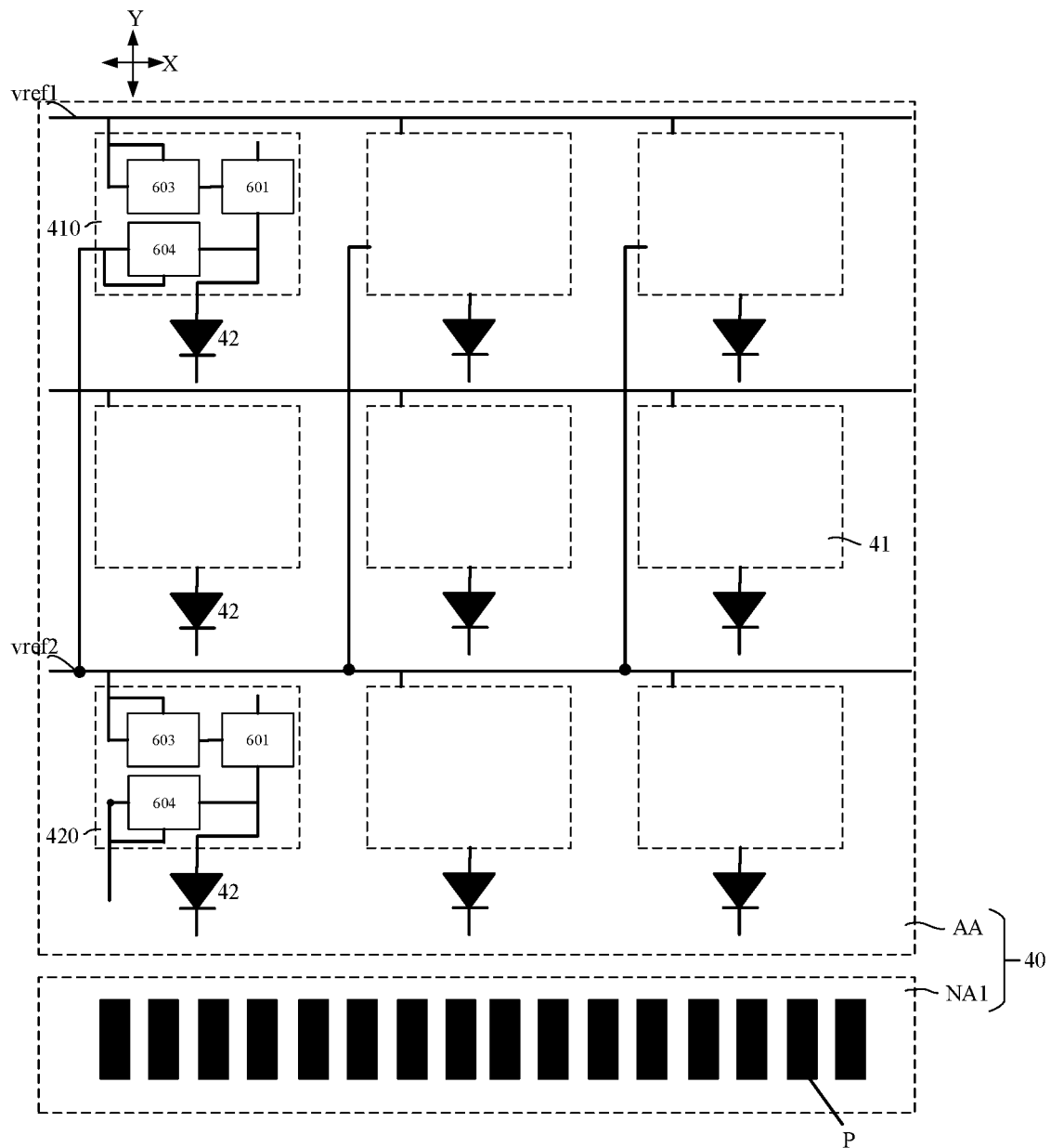
FIG. 16 is a schematic circuit diagram of a display panel according to yet another embodiment of the present disclosure.

FIG. 16 is a schematic circuit diagram of a display panel according to yet another embodiment of the present disclosure. As shown in FIG. 16, the first pixel circuit 410 and the second pixel circuit 420 may be separated by k pixel circuits 41 in the second direction Y, where k≥0 and k is an integer. In FIG. 16, k=1 is taken as an example for illustration. It should be noted that k may be greater than 1, which is not limited in the present disclosure.

The control terminal of the first initialization device 603 in the first pixel circuit 410 may be electrically connected to the first initialization signal line vref1, and the control terminal of the second initialization device 604 in the first pixel circuit 410 may be electrically connected to the second initialization signal line vref2. In addition, the first terminal of the first initialization device 603 in the first pixel circuit 410 may be electrically connected to the first initialization signal line vref1, and the first terminal of the second initialization device 604 in the first pixel circuit 410 may be electrically connected to the second initialization signal line vref2.

The second initialization signal line vref2 is configured to initialize a target node (such as the first node N1) in the second pixel circuit 420. The control terminal of the second initialization device 604 in the first pixel circuit 410 is electrically connected to the second initialization signal line vref2. In this way, the initialization of the first electrode of the light-emitting element 42 connected to the first pixel circuit 410 and the initialization of the target node in the second pixel circuit 420 may be performed simultaneously. In addition, the initialization of the first node N1 in the first pixel circuit 410 and the initialization of the first electrode of the light-emitting element 42 connected to the first pixel circuit 410 may be performed separately in different time periods.

In this way, the selection of the time period for initializing the first electrode of the light-emitting element 42 connected to the first pixel circuit 410 is more flexible. By flexibly adjusting the value of k as required, the time period during which the first electrode of the light-emitting element 42 connected to the first pixel circuit 410 is initialized may be flexibly adjusted, and to meet the requirements of different situations.

Further referring to FIG. 16, according to some embodiments of the present disclosure, the display panel 40 may include a display area AA and a bonding area NA1 arranged in the second direction Y. The light-emitting elements (not shown in FIG. 16) may be located in display area AA. The bonding area NA1 may be provided with a bonding pad P, which may be used for electrical connection with a flexible circuit board (not shown in FIG. 16) or a driving chip (not shown in FIG. 16).

In the second direction Y, the second pixel circuit 420 may be located on a side of the first pixel circuit 410 close to the bonding area NA1. In one screen refresh cycle, when the display panel employs forward scanning, the second pixel circuit 420 may be scanned after the first pixel circuit 410 is scanned.

In this way, the second initialization signal line vref2 may be used not only to provide an initialization signal for initializing the target node (such as the first node N1) in the second pixel circuit 420, but also to control the turn-on/off of the first initialization device 603 in the second pixel circuit 420. In addition, the second initialization signal line vref2 is used to provide an initialization signal for initializing the first electrode of the light-emitting element 42 connected to the first pixel circuit 410, and is further used to control the turn-on/off of second initialization device 604 in the first pixel circuit 410. In this way, the quantity of the scanning signal lines and/or reference voltage signals in the display panel can be further reduced, which is beneficial to simplify the wiring design and lower the production cost.

Figure 17:
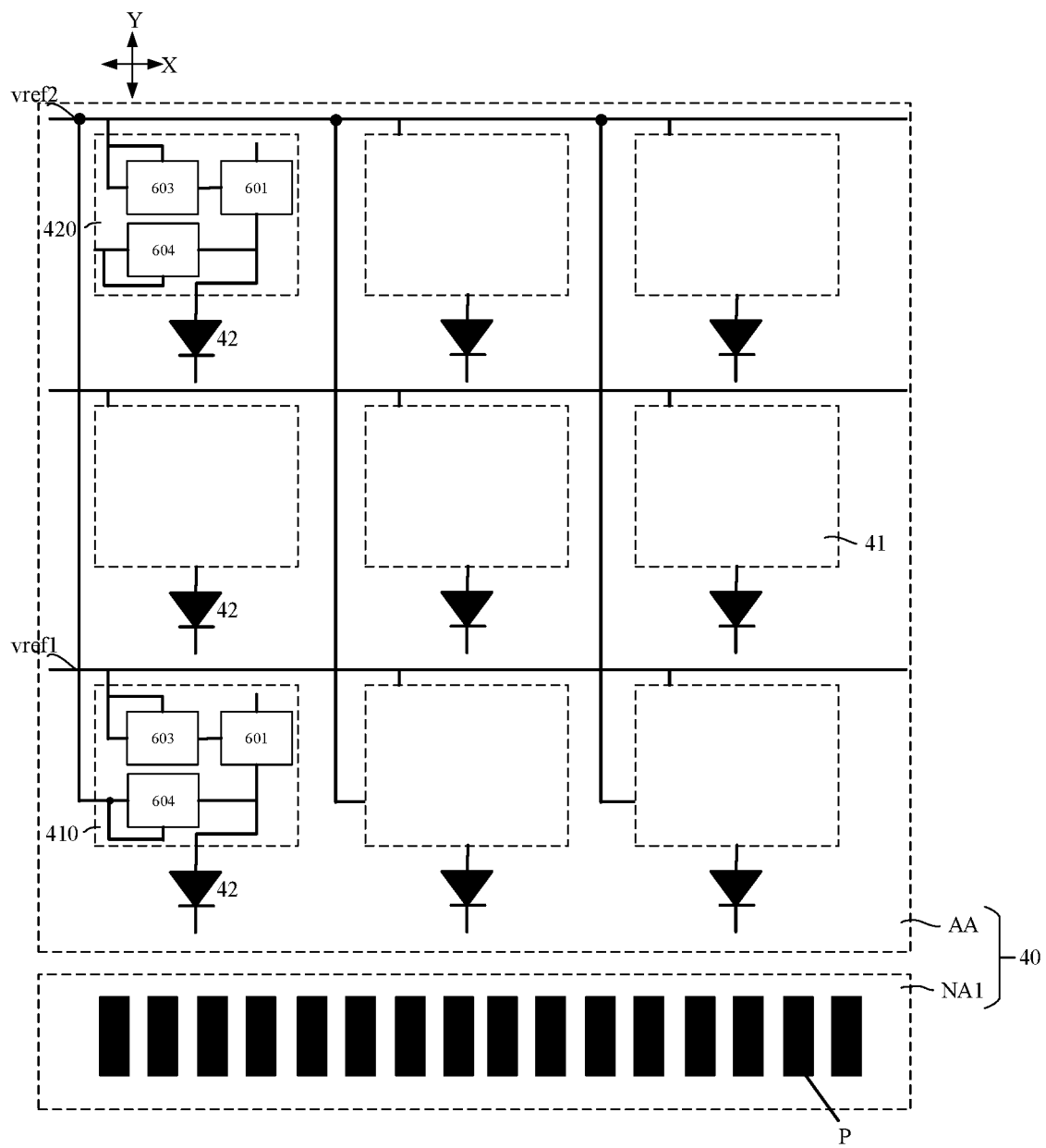
FIG. 17 is a schematic circuit diagram of a display panel according to yet another embodiment of the present disclosure.

FIG. 17 is a schematic circuit diagram of a display panel according to yet another embodiment of the present disclosure. As shown in FIG. 17, in some other embodiments, the second pixel circuit 420 may be located on a side of the first pixel circuit 410 away from the bonding area NA1 in the second direction Y. In one screen refresh cycle, when the display panel employs forward scanning, the first pixel circuit 410 may be scanned after the second pixel circuit 420 is scanned. In this way, the quantity of scanning signal lines and/or reference voltage signal lines in the display panel may be further reduced, which is beneficial to simplify wiring design and lower production cost.

Figure 18:
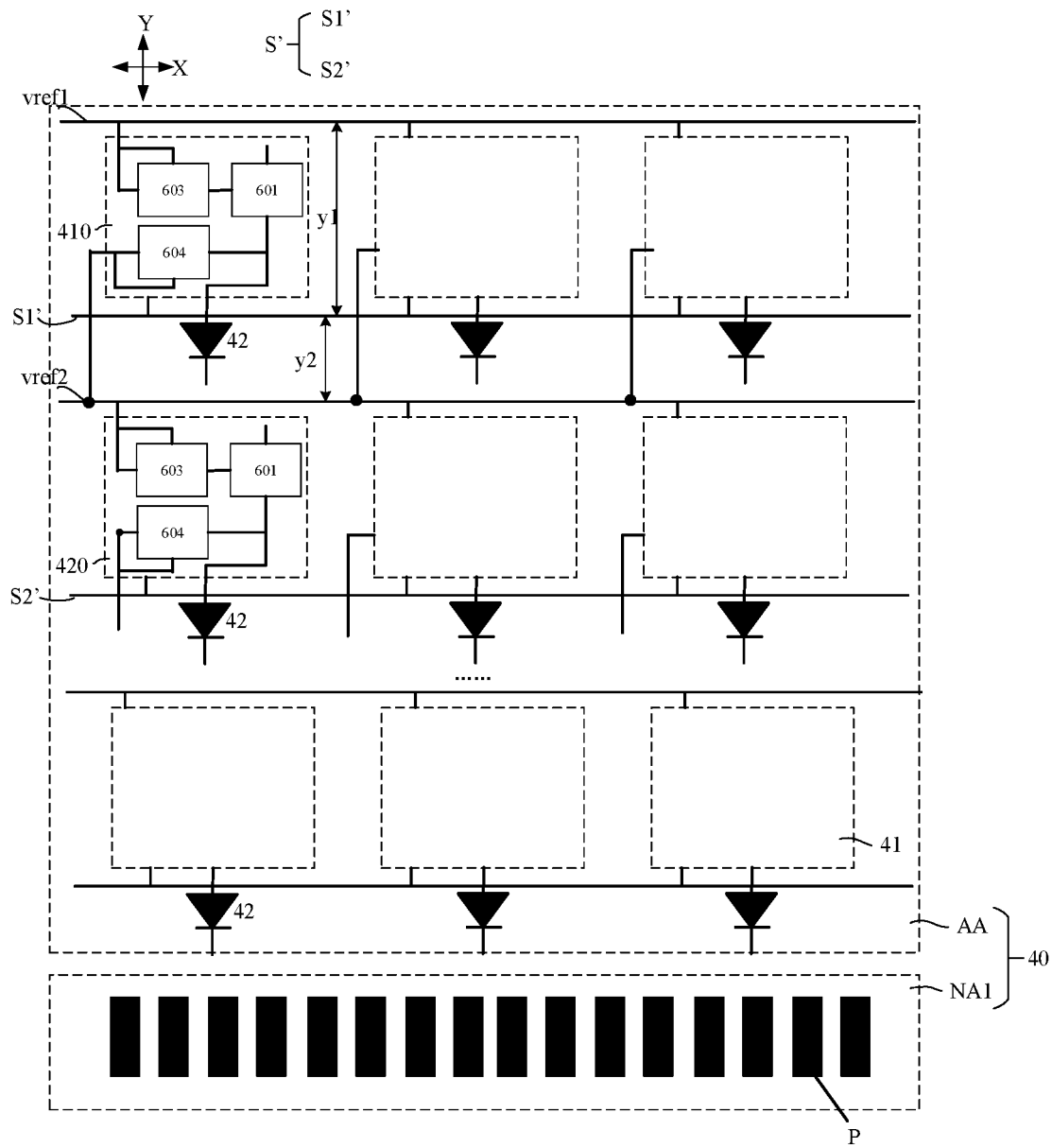
FIG. 18 is a schematic circuit diagram of a display panel according to yet another embodiment of the present disclosure.

FIG. 18 is a schematic circuit diagram of a display panel according to yet another embodiment of the present disclosure. As shown in FIG. 18, according to some embodiments of the present disclosure, the display panel 40 may further include a scanning signal line S' extending in the first direction X. The scanning signal line S' is electrically connected to the pixel circuit. The scanning signal line S' may be configured to transmit a scanning signal. It should be noted that the scanning signal line S' here is different from the above scanning signal line Sn. The scanning signal lines S' here represent a scanning signal line electrically connected to the pixel circuit, while the above scanning signal line Sn represents the scanning signal line electrically connected to the second initialization device in the pixel circuit.

The scanning signal line S' may include a first scanning signal line S1' and a second scanning signal line S2'. The first scanning signal line S1' may be electrically connected to the first pixel circuit 410, and the second scanning signal line S2' may be electrically connected to the second pixel circuit 420. It should be noted that the first scanning signal line S1' is different from the above first scanning line S1. The first scanning signal line S1' here represents the scanning signal line electrically connected to the first pixel circuit 410, while the above first scanning line S1 represents the scanning signal line electrically connected to the data writing device in the pixel circuit.

In the embodiment shown in FIG. 18, the first pixel circuit 410 is adjacent to the second pixel circuit 420 in the second direction Y. A phase of a pulse signal provided by the first scanning signal line S1' may be the same as a phase of a pulse signal provided by the second initialization signal line S2'. A period of the pulse signal provided by the first scanning signal line S1' may be the same as a period of the pulse signal provided by the second initialization signal line S2'. An amplitude of the pulse signal provided by the first scanning signal line S1' may be the same as or different from an amplitude of the pulse signal provided by the second initialization signal line S2'. In other words, the first scanning signal line S1' and the second initialization signal line S2' may be connected to the same shift register, and to transmit pulse signals with the same phase and period.

Further referring to FIG. 18, in the second direction Y, a first distance y1 between the first scanning signal line S1' and the first initialization signal line vref1 is greater than a second distance y2 between the first scanning signal line S1' and the second initialization signal line vref2. That is, the space between the first scanning signal line S1' and the second initialization signal line vref2 is less than the space between the first scanning signal line S1' connected to the first pixel circuit and the first initialization signal line vref1.

Such arrangement has the following advantage. Given that the first scanning signal line S1' and the second initialization signal line vref2 are electrically connected to the same pulse signal output terminal (such as a shift register), the wiring length between the pulse signal output terminal and at least one of the first scanning signal line S1' and the second initialization signal line vref2 can be reduced by arranging the first scanning signal line S1' to be close to the second initialization signal lines vref2, which is conducive to simplifying the wiring design and reducing production cost.

According to some embodiments of the present disclosure, the initialization signal transmitted by the initialization signal line vref may also be the same as or similar to the scanning signal transmitted by the scanning signal line S', and may be, as an example, outputted through multiple cascaded shift registers.

Figure 19:
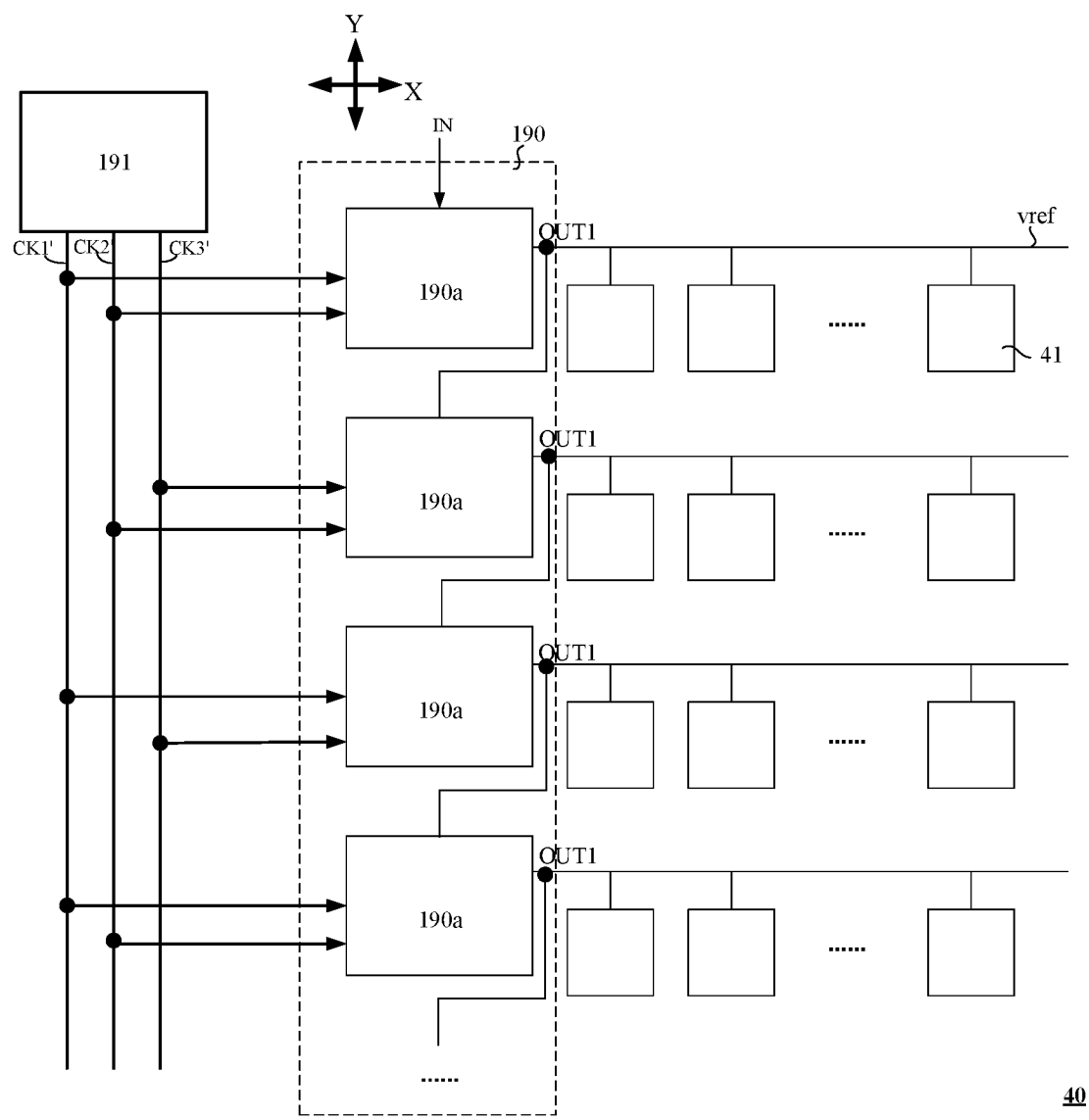
FIG. 19 is a schematic circuit diagram of a display panel according to yet another embodiment of the present disclosure.

FIG. 19 is a schematic circuit diagram of a display panel according to yet another embodiment of the present disclosure. As shown in FIG. 19, according to some embodiments of the present disclosure, the display panel 40 may further include an initialization signal output circuit 190 and a pulse signal generator 191. The initialization signal output circuit 190 may include multiple cascaded first shift registers 190a. The pulse signal generator 191 may include clock signal terminals CK1' to CK3'. The clock signal terminals CK1' to CK3' are configured to provide clock signals to the first shift registers 190a. In some examples, the first shift register 190a of each stage may be electrically connected to two of the clock signal terminals CK1' to CK3', and an adjacent first shift register 190a may be connected to different clock signal terminals from the first shift register 190a of the stage. For example, the first shift register 190a at the first-stage is connected to the clock signal terminal CK1' and the clock signal terminal CK2', and the first shift register 190a at the second-stage is connected to the clock signal terminal CK2' and the clock signal terminal CK3', the first shift register 190a at the third-stage is connected to the clock signal terminal CK1' and the clock signal terminal CK3'. A first output terminal OUT1 of the first shift register 190a may be electrically connected to one of the initialization signal line vref, and the first output terminal OUT1 of the first shift register 190a may be configured to provide the initialization signal to the initialization signal line vref. As mentioned above, the initialization signal line vref may transmit the enabling level of the initialization signal to the pixel circuit 41 to initialize the target node in the pixel circuit 41.

The multiple cascaded first shift registers 190a may sequentially provide initialization signals to respective rows of pixel circuits in the display panel, and to transmit the initialization signals row by row. In this way, the initialization stages of different pixel circuits do not need to be unified, and may be performed separately in different time periods. Hence, the pixel circuits close to the top row may initialize for the next frame without waiting for the end of the light-emitting stage of pixel circuits in the last row, shortening the time spent on one frame, and improving the refresh rate of the display panel.

In addition, by transmitting the initialization signal row by row, it can ensure that the initialization processes of respective rows of pixel circuits in the display panel are performed sequentially, which is less prone to errors and ensures that each row of pixel circuits can drive the light-emitting elements to emit light normally.

Figure 20:
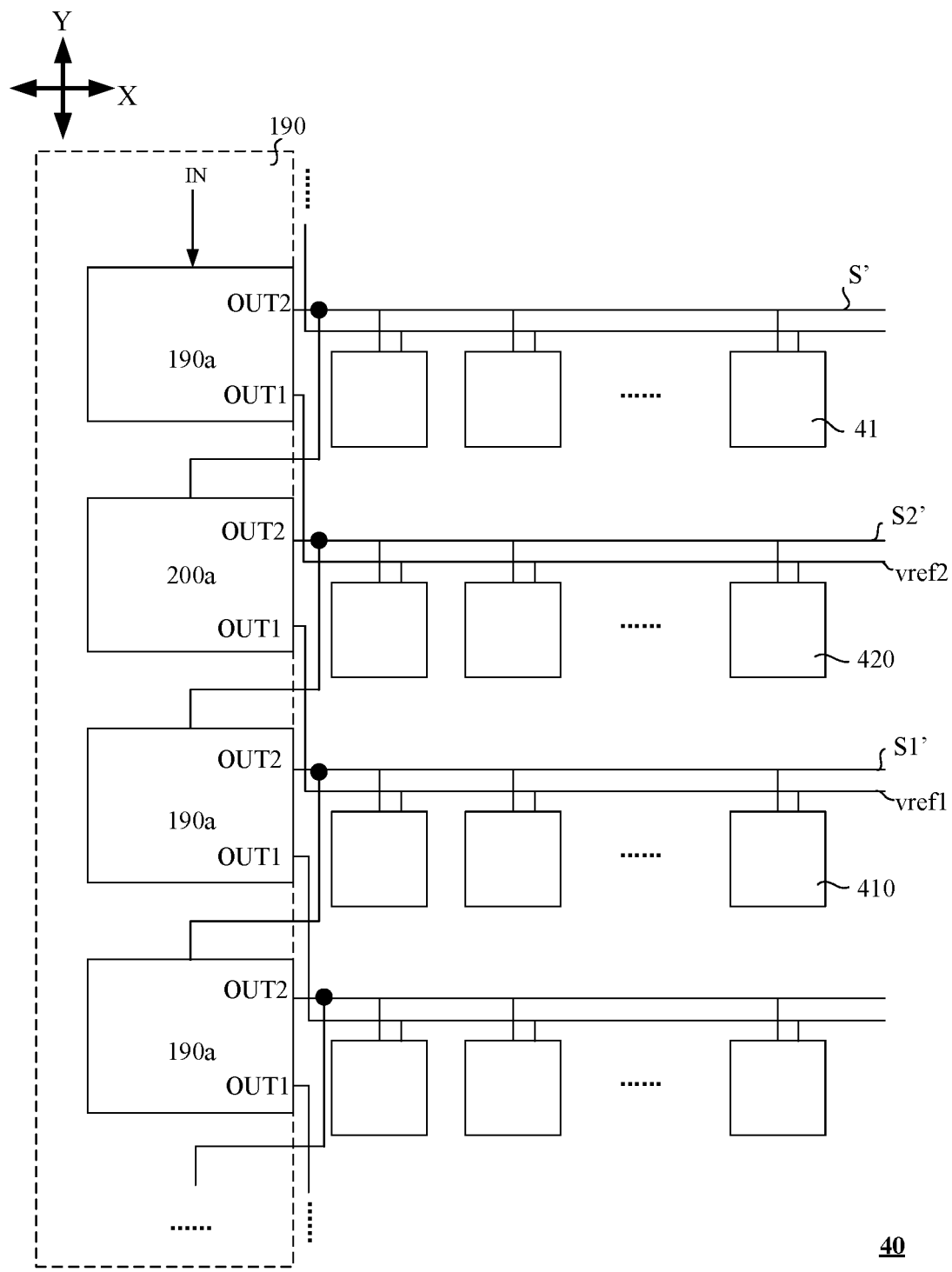
FIG. 20 is a schematic circuit diagram of a display panel according to yet another embodiment of the present disclosure.

FIG. 20 is a schematic circuit diagram of a display panel according to yet another embodiment of the present disclosure. As shown in FIG. 20, according to some embodiments of the present disclosure, the first shift register 190a may further include a second output terminal OUT2. The second output terminal OUT2 of the first shift register 190a is electrically connected to one of the scanning signal line S', and the second output terminal OUT2 of the first shift register 190a is configured to provide the scanning signal to the scanning signal line S'. The scanning signal line S' may transmit the scanning signal to the pixel circuit 41 to control the turn-on/off of the thin-film transistor in the pixel circuit 41.

In other words, the first shift register 190a may output not only the initialization signal for initializing the target node in the pixel circuit 41, but also the scanning signal.

In this way, the initialization signal output circuit may output both the scanning signal and the initialization signal, which can realize the multiplexing of circuits or electronic devices and to reduce the quantity of signal lines and electronic devices in the display panel, and lower production cost, which is beneficial to reduce the frame size of the display panel.

It should be noted that, the example illustrated in FIG. 20 is that the input terminal of one first shift register 190a is connected to the second output terminal OUT2 of the first shift register 190a of a previous stage. In other embodiments, the input terminal of one first shift register 190a may be connected to the first output terminal OUT1 of the first shift register 190a at the previous stage, to form a cascaded structure, which is not limited in the present disclosure.

Further referring to FIG. 20, according to some embodiments of the present disclosure, the first pixel circuit 410 and the second pixel circuit 420 are separated by k pixel circuits in the second direction Y, where, k≥0 and k is an integer. For instance, the example illustrated in FIG. 20 is k=0.

The scanning signal line S' may include a first scanning signal line S1' and a second scanning signal line S2'. The first scanning signal line S1' is electrically connected to the first pixel circuit 410, and the second scanning signal line S2' is electrically connected to the second pixel circuit 420.

The first shift register 190a may include a first target shift register 200a. The first output terminal OUT1 of the first target shift register 200a may be electrically connected to the first initialization signal line vref1, and the second output terminal OUT2 of the first target shift register 200a may be electrically connected to the second scanning signal line S2.

In other words, the initialization signal line vref and the scanning signal line S' connected to the first shift register 190a may correspond to different rows of pixel circuits. In some examples, the first pixel circuit 410 may be located in m rows below the second pixel circuit 420, where m≥1 and is an integer. That is, the first shift register 190a may be electrically connected to the scanning signal line S' connected to the pixel circuits in the same row, and may also be electrically connected to the initialization signal line vref connected to the pixel circuits in the m rows below.

The circuit structure of the first shift register 190a will be illustrated below in conjunction with some embodiments.

Figure 21:
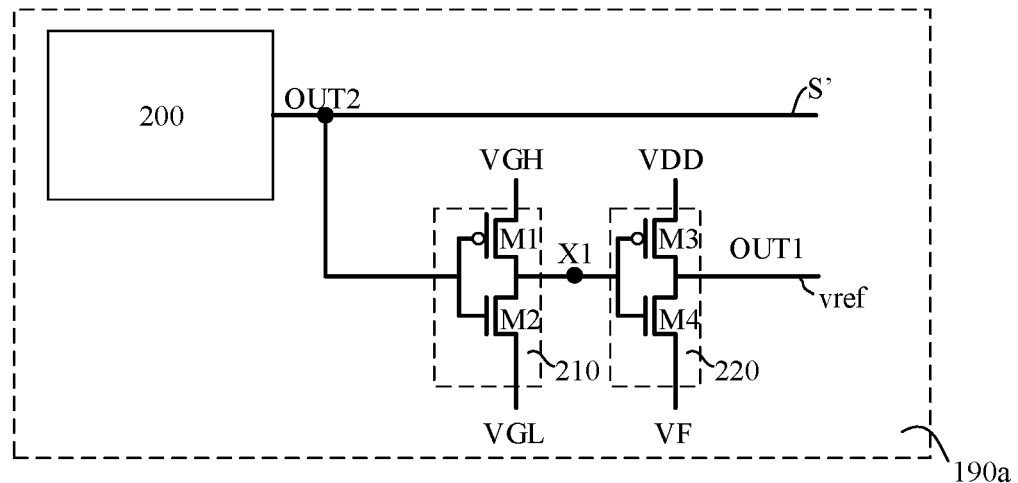
FIG. 21 is a schematic circuit diagram of a first shift register in a display panel according to an embodiment of the present disclosure.

FIG. 21 is a schematic circuit diagram of a first shift register in a display panel according to an embodiment of the present disclosure. As shown in FIG. 21, according to some embodiments of the present disclosure, the first shift register 190a may include a first inverter 210 and a second inverter 220. The first inverter 210 and the second inverter 220 function to realize level inversion. For example, in a case that an input of the first inverter 210 is a high level, the first inverter 210 outputs a low level after level inversion. The second inverter 220 works similar to the first inverter 210.

A control terminal of the first inverter 210 is electrically connected to a second output terminal OUT2 of the first shift register 190a, a first input terminal of the first inverter 210 is electrically connected to a first power supply voltage signal line VGH, and a second input terminal of the first inverter 210 is electrically connected to a second power supply voltage signal line VGL, and an output terminal of the first inverter 210 is electrically connected to a control terminal of the second inverter 220.

A first input terminal of the second inverter 220 is electrically connected to a first positive voltage signal line VDD, and a second input terminal of the second inverter 220 is electrically connected to a first negative voltage signal line VF, and an output terminal of the second inverter 220 is the first output terminal OUT1 of the first shift register 190a. It should be noted that the first negative voltage signal line VF and the reference voltage signal line vf may represent different signal lines, but the signal output by the first negative voltage signal line VF and the signal output by the reference voltage signal line vf may be the same or different, which is not limited in this embodiment of the present disclosure.

The first output terminal OUT1 of the first shift register 190a may be electrically connected to the initialization signal line vref to output the initialization signal. The second output terminal OUT2 of the first shift register 190a may be electrically connected to the scanning signal line S' to output the scanning signal.

In some examples, the voltage value transmitted by the first power supply voltage signal line VGH is greater than or equal to the voltage value transmitted by the first positive voltage signal line VDD; the voltage value transmitted by the first positive voltage signal line VDD is greater than the voltage value transmitted by the first negative voltage signal line VF; and the voltage value transmitted by the first negative voltage signal line VF is greater than or equal to the voltage value transmitted by the second power supply voltage signal line VGL, i.e., VGH≥VDD>VF≥VGL. In other words, the amplitude of the enabling level of the initialization signal outputted by the first shift register 190a may be the same as or different from the amplitude of the enabling level of the scanning signal outputted by the first shift register 190a. The amplitude of the non-enabling level of the initialization signal outputted by the shift register 190a may be the same as or different from the amplitude of the non-enabling level of the scanning signal outputted by the first shift register 190a.

In this way, by providing the first inverter 210 and the second inverter 220, the same first shift register 190a may output the scanning signal and the initialization signal with same or different amplitudes to meet different driving requirements.

Further referring to FIG. 21, in some embodiments, the first inverter 210 includes a first P-type transistor M1 and a first N-type transistor M2, and the second inverter 220 includes a second P-type transistor M3 and a second N-type transistor M4.

Both a gate of the first P-type transistor M1 and a gate of the first N-type transistor M2 are electrically connected to the second output terminal OUT2 of the first shift register 190a. A first electrode of the first P-type transistor M1 is electrically connected to the first power supply voltage signal line VGH. A first electrode of the first N-type transistor M2 is electrically connected to the second power supply voltage signal line VGL. A second electrode of the first P-type transistor M1 and a second electrode of the first N-type transistor M2 are both electrically connected to a first connection node X1.

Both a gate of the second P-type transistor M3 and a gate of the second N-type transistor M4 are electrically connected to the first connection node X1. A first electrode of the second P-type transistor M3 is electrically connected to the first positive voltage signal line VDD. A first electrode of the second N-type transistor M4 is electrically connected to the first negative voltage signal line VF. A second electrode of the second P-type transistor M3 and a second electrode of the second N-type transistor M4 are both electrically connected to the first output terminal OUT1 of the first shift register 190a.

Taking the enabling level of the initialization signal and the enabling level of the scanning signal are the low level as an example, when the second output terminal OUT2 of the first shift register 190a outputs the enabling level (i.e., the low level) of the scanning signal, the first P-type transistor M1 is turned on, the first N-type transistor M2 is turned off, and the high level voltage signal of the first power supply voltage signal line VGH is transmitted to the first connection node X1. The second N-type transistor M4 is turned on in response to the high level of the first connection node X1, the second P-type transistor M3 is turned off, and the second N-type transistor M4 transmits the low level voltage signal of the first negative voltage signal line VF to the first output terminal OUT1 of the first shift register 190a, and the first output terminal OUT1 of the first shift register 190a outputs the enabling level (i.e., the low level) of the initialization signal.

Figure 22:
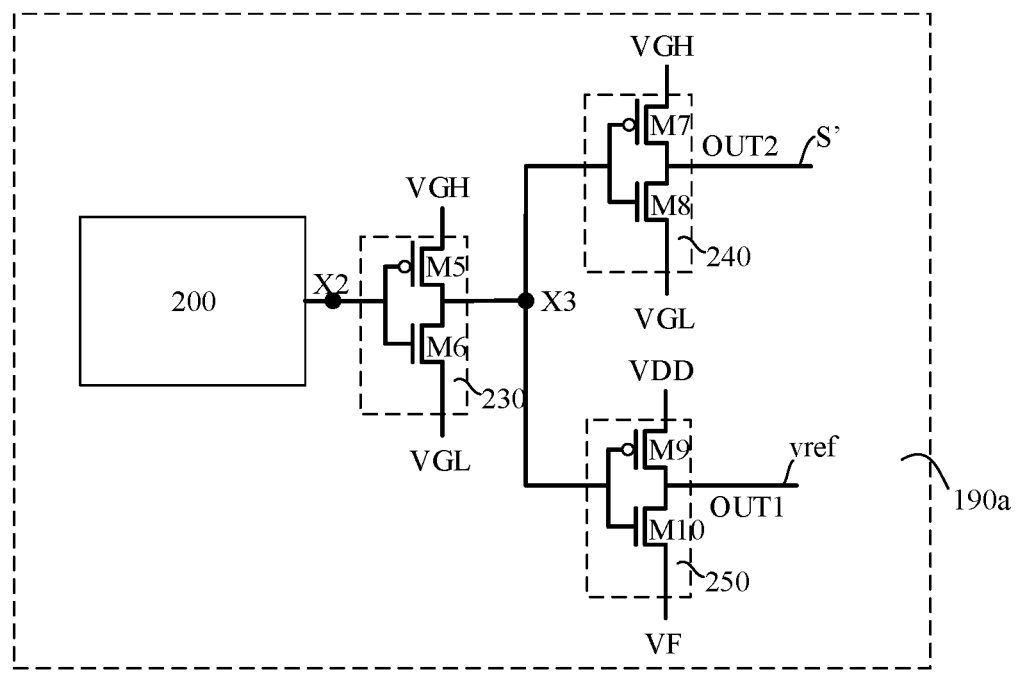
FIG. 22 is a schematic circuit diagram of a first shift register in a display panel according to another embodiment of the present disclosure.

FIG. 22 is a schematic circuit diagram of a first shift register in a display panel according to another embodiment of the present disclosure. As shown in FIG. 22, differing from the embodiment shown in FIG. 21, according to other embodiments of the present disclosure, the first shift register 190a includes a third inverter 230, a fourth inverter 240 and fifth inverter 250.

A control terminal of the third inverter 230 is electrically connected to a second connection node X2, a first input terminal of the third inverter 230 is electrically connected to the first power supply voltage signal line VGH, and a second input terminal of the third inverter 230 is electrically connected to the second power supply voltage signal line VGL. The first shift register 190a may include an output device 200, and the second connection node X2 may be electrically connected to an output terminal of the output device 200. The output device 200 may be configured to output the enabling level or the non-enabling level. The specific circuit structure of the output device 200 is not limited in the present disclosure. The structure of the output device 200 will be illustrated below with examples.

A control terminal of the fourth inverter 240 is electrically connected to an output terminal of the third inverter 230, a first input terminal of the fourth inverter 240 is electrically connected to the first power supply voltage signal line VGH, and a second input terminal of the fourth inverter 240 is electrically connected to the second power supply voltage signal line VGL, and an output terminal of the fourth inverter 240 is the second output terminal OUT2 of the first shift register 190a. The second output terminal OUT2 of the first shift register 190a is electrically connected to one of the scanning signal line S', and the second output terminal OUT2 of the first shift register 190a is configured to provide the scanning signal to the pixel circuit through the scanning signal line S'.

A control terminal of the fifth inverter 250 is electrically connected to the output terminal of the third inverter, a first input terminal of the fifth inverter 250 is electrically connected to the first positive voltage signal line VDD, and a second input terminal of the fifth inverter 250 is electrically connected to the first negative voltage signal line VF, and an output terminal of the fifth inverter 250 is the first output terminal OUT1 of the first shift register 190a.

Taking the enabling level of the initialization signal and the enabling level of the scanning signal are the low level as an example, when the second connection node X2 is at the low level, the third inverter 230 outputs the high level signal of the first power supply voltage signal line VGH in response to the low level of the second connection node X2. The fourth inverter 240 outputs the low level signal of the second power supply voltage signal line VGL in response to the high level signal outputted by the third inverter 230. The fifth inverter 250 outputs the low level signal of the first negative voltage signal line VF in response to the high level signal outputted by the third inverter 230.

As described above, in some examples, VGH≥VDD>VF≥VGL. In other words, the amplitude of the enabling level of the initialization signal outputted by the first shift register 190a may be the same as or different from the amplitude of the enabling level of the scanning signal outputted by the first shift register 190a. The amplitude of the non-enabling level of the initialization signal outputted by the shift register 190a may be the same as or different from the amplitude of the non-enabling level of the scanning signal outputted by the first shift register 190a.

In this way, by providing the third inverter 230, the fourth inverter 240 and the fifth inverter 250, the same first shift register 190a may output the scanning signal and the initialization signal with same or different amplitudes to meet different driving requirements.

Further referring to FIG. 22, in some embodiments, the third inverter 230 includes a third P-type transistor M5 and a third N-type transistor M6. The fourth inverter includes a fourth P-type transistor M7 and a fourth N-type transistor M8, and the fifth inverter includes a fifth P-type transistor M9 and a fifth N-type transistor M10.

Both a gate of the third P-type transistor M5 and a gate of the third N-type transistor M6 are electrically connected to the second connection node X2. A first electrode of the third P-type transistor M5 is electrically connected to the first power supply voltage signal line VGH. A first electrode of the third N-type transistor M6 is electrically connected to the second power supply voltage signal line VGL. A second electrode of the third P-type transistor M5 and a second electrode of the third N-type transistor M6 are both electrically connected to a third Node X3.

Both a gate of the fourth P-type transistor M7 and a gate of the fourth N-type transistor M8 are electrically connected to the third connection node X3. A first electrode of the fourth P-type transistor M7 is electrically connected to the first power supply voltage signal line VGH. A first electrode of the fourth N-type transistor M8 is electrically connected to the second power supply voltage signal line VGL. A second electrode of the fourth P-type transistor M7 and a second electrode of the fourth N-type transistor M8 are both electrically connected to the second output terminal OUT2 of the first shift register 190a.

Both a gate of the fifth P-type transistor M9 and a gate of the fifth N-type transistor M10 are electrically connected to the third connection node X3. A first electrode of the fifth P-type transistor M9 is electrically connected to the first positive voltage signal line VDD. A first electrode of the fifth N-type transistor M10 is electrically connected to the first negative voltage signal line VF. A second electrode of the fifth P-type transistor M9 and a second electrode of the fifth N-type transistor M10 are both electrically connected to the first output terminal OUT1 of a first shift register 190a.

In this way, only 6 transistors including the third P-type transistor M5 to the fifth N-type transistor M10 are provided, and the same first shift register 190a may output the scanning signal and the initialization signal with same or different amplitudes to meet different driving requirements.

Figure 23:
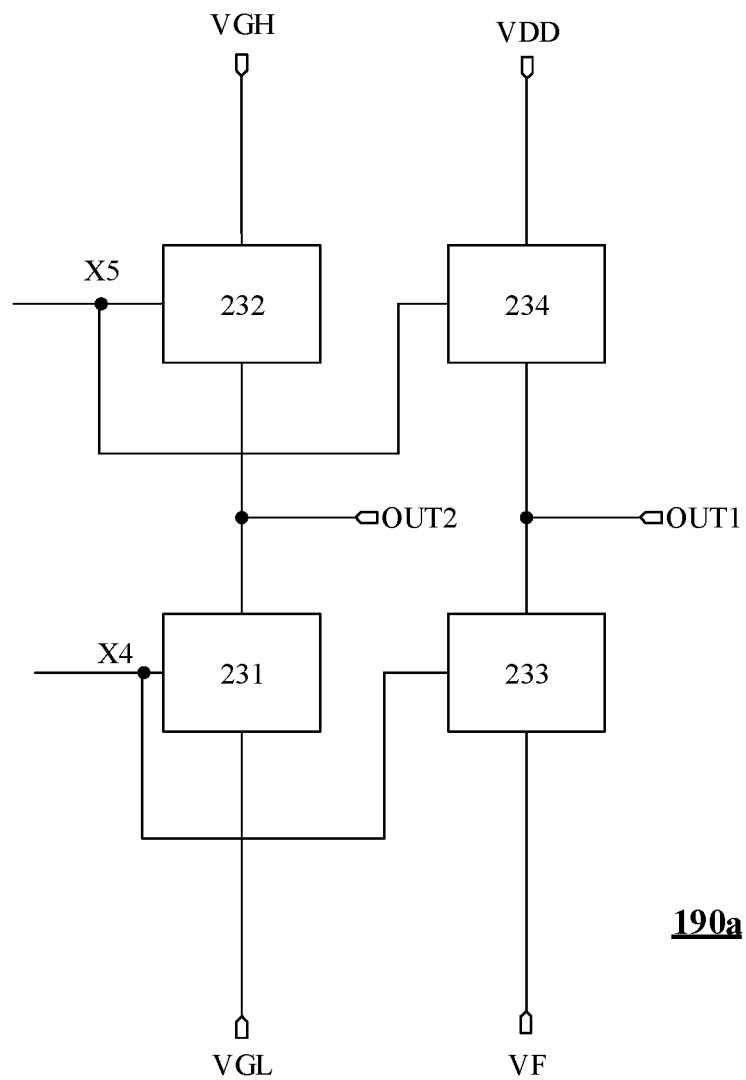
FIG. 23 is a schematic circuit diagram of a first shift register in a display panel according to yet another embodiment of the present disclosure.

FIG. 23 is a schematic circuit diagram of a first shift register in a display panel according to yet another embodiment of the present disclosure. As shown in FIG. 23, differing from the embodiment shown in FIG. 21 and the embodiment shown in FIG. 22, according to some other embodiments of the present disclosure, the first shift register 190a may include a first output device 231, a second output device 232, a third output device 233 and a fourth output device 234.

A control terminal of the first output device 231 is electrically connected to a fourth connection node X4, a first terminal of the first output device 231 is electrically connected to the second power supply voltage signal line VGL, and a second terminal of the first output device 231 is electrically connected to the second output terminal OUT2 of the shift register 190a.

A control terminal of the second output device 232 is electrically connected to a fifth connection node X5, a first terminal of the second output device 232 is electrically connected to the first power supply voltage signal line VGH, and a second terminal of the second output device 232 is electrically connected to the second output terminal OUT2 of the shift register 190a.

A control terminal of the third output device 233 is electrically connected to the fourth connection node X4, a first terminal of the third output device 233 is electrically connected to the first negative voltage signal line VF, and a second terminal of the third output device 233 is electrically connected to the first output terminal OUT1 of the shift register 190a.

A control terminal of the fourth output device 234 is electrically connected to the fifth connection node X5, a first terminal of the fourth output device 234 is electrically connected to the first positive voltage signal line VDD, and a second terminal of the fourth output device 234 is electrically connected to the first output terminal OUT1 of the shift register 190a.

Taking the enabling level of the initialization signal and the enabling level of the scanning signal are the low level as an example, when the fourth connection node X4 is at the enabling level and the fifth connection node X5 is at the non-enabling level, the first output device 231 and the third output device 233 are turned on, the second output device 232 and the fourth output device 234 are turned off, and the first output device 231 transmits the low level voltage signal of the second power supply voltage signal line VGL to the second output terminal OUT2 of the shift register 190a, and the third output device 233 transmits the low level voltage signal of the first negative voltage signal line VF to the first output terminal OUT1 of the shift register 190a.

When the fourth connection node X4 is at the non-enabled level and the fifth connection node X5 is at the enabled level, the first output device 231 and the third output device 233 are turned off, and the second output device 232 and the fourth output device 234 are turned on, the second output device 232 transmits the high level voltage signal of the first power supply voltage signal line VGH to the second output terminal OUT2 of the shift register 190a, and the fourth output device 234 transmits the high level voltage signal of the first positive voltage signal line VDD to the first output terminal OUT1 of the shift register 190a.

As described above, in some examples, VGH≥VDD>VF≥VGL. In other words, the amplitude of the enabling level of the initialization signal outputted by the first shift register 190a may be the same as or different from the amplitude of the enabling level of the scanning signal outputted by the first shift register 190a. The amplitude of the non-enabling level of the initialization signal outputted by the shift register 190a may be the same as or different from the amplitude of the non-enabling level of the scanning signal outputted by the first shift register 190a.

In this way, by providing the first output device 231, the second output device 232, the third output device 233 and the fourth output device 234, the same first shift register 190a may output the scanning signal and the initialization signal with same or different amplitudes to meet different driving requirements.

Figure 24:
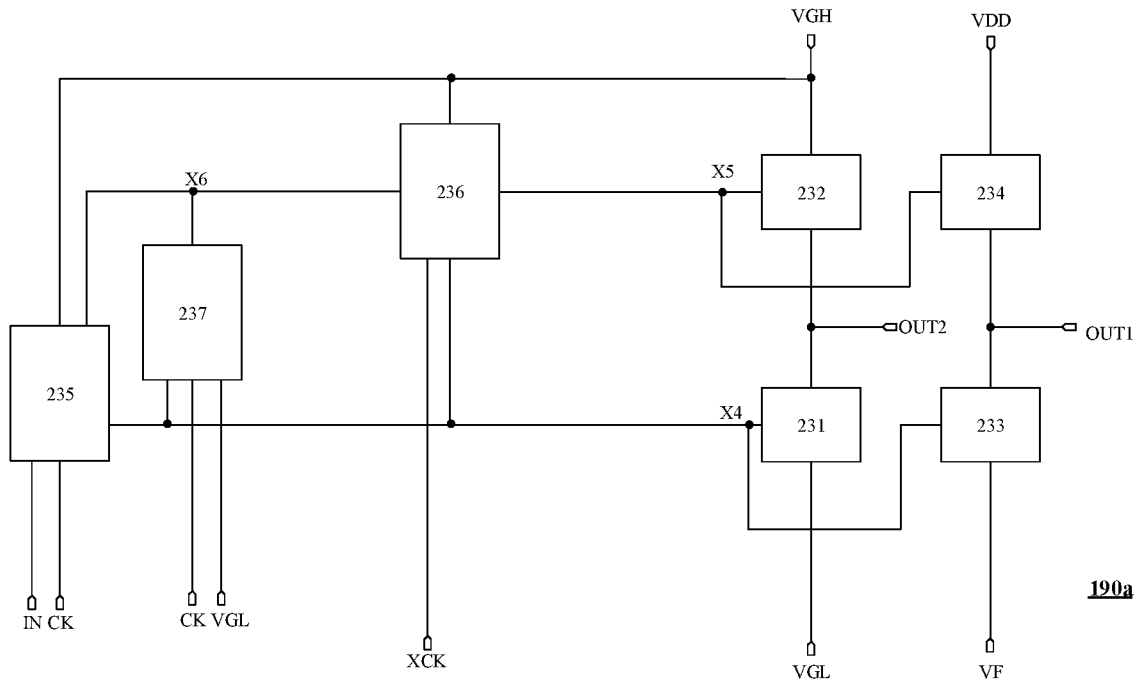
FIG. 24 is a schematic circuit diagram of a first shift register in a display panel according to yet another embodiment of the present disclosure.

FIG. 24 is a schematic circuit diagram of a first shift register in a display panel according to yet another embodiment of the present disclosure. As shown in FIG. 24, in some embodiments, the first shift register 190a may further include a fourth connection node control device 235, a fifth connection node control device 236 and a sixth connection node control device 237

The fourth connection node control device 235 is electrically connected to a second clock signal line CK, an input terminal IN of the first shift register, the first power supply voltage signal line VGH, a sixth connection node X6 and the fourth connection node X4, and is configured to transmit the voltage of the input terminal IN of the first shift register to the fourth connection node X4 in response to an enabling level of the second clock signal line CK.

The fifth connection node control device 236 is electrically connected to a first clock signal line XCK, the fourth connection node X4, the fifth connection node X5 and the first power supply voltage signal line VGH, and is configured to transmit the voltage of the first power supply voltage signal line VGH to the fifth connection node X5 in response to the enabling level of the fourth connection node, and transmit the enabling level of the first clock signal line XCK to the fifth connection node X5 in response to the enabling level of the sixth connection node X6 and the first clock signal line XCK.

The sixth connection node control device 237 is electrically connected to the second clock signal line CK, the second power supply voltage signal line VGL, the fourth connection node X4 and the sixth connection node X6, and is configured to transmit the voltage of the second power supply voltage signal line VGL to the sixth connection node X6 in response to the enabling level of the second clock signal line CK, and transmit the voltage of the second clock signal line CK to the sixth connection node X6 in response to the enabling level of the fourth connection node X4.

Figure 25:
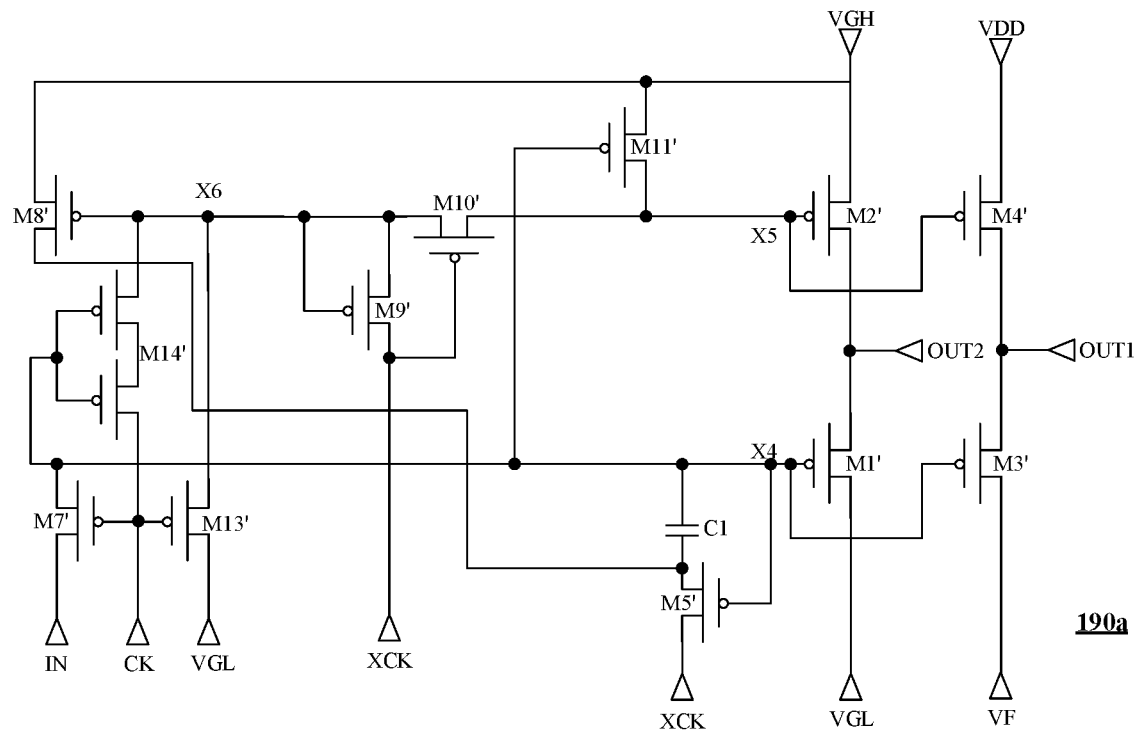
FIG. 25 is a schematic circuit diagram of a first shift register in a display panel according to yet another embodiment of the present disclosure.

FIG. 25 is a schematic circuit diagram of a first shift register in a display panel according to yet another embodiment of the present disclosure. Referring to FIG. 24 and FIG. 25, in some embodiments, the first output device 231 may include a first transistor M1', and the second output device 232 may include a second transistor M2', the third output device 233 may include a third transistor M3', and the fourth output device 234 may include a fourth transistor M4'. The fourth connection node control device 235 may include a seventh transistor M7' and an eighth transistor M8', and the fifth connection node control device 236 may include a ninth transistor M9', a tenth transistor M10' and an eleventh transistor M11', the sixth connection node control device 237 may include a thirteenth transistor M13' and at least two fourteenth transistors M14'. The circuit structure is shown in FIG. 25, which will not be described in detail here. Compared with a single transistor, by arranging at least two fourteenth transistors in series, the voltage resistance capability of the transistor can be improved, which is beneficial to the circuit stability.

As described above, in some embodiments, the first shift register 190a may be electrically connected to the scanning signal line S' connected to the pixel circuits in the same row, and may also be electrically connected to the initialization signal line vref connected to the pixel circuits in the m rows below. The embodiments of the present disclosure further considered that in a case that the above circuit connection method is used, the initialization signal lines vref connected to the pixel circuits in the first m rows need an additional shift register to provide the initialization signal.

Figure 26:
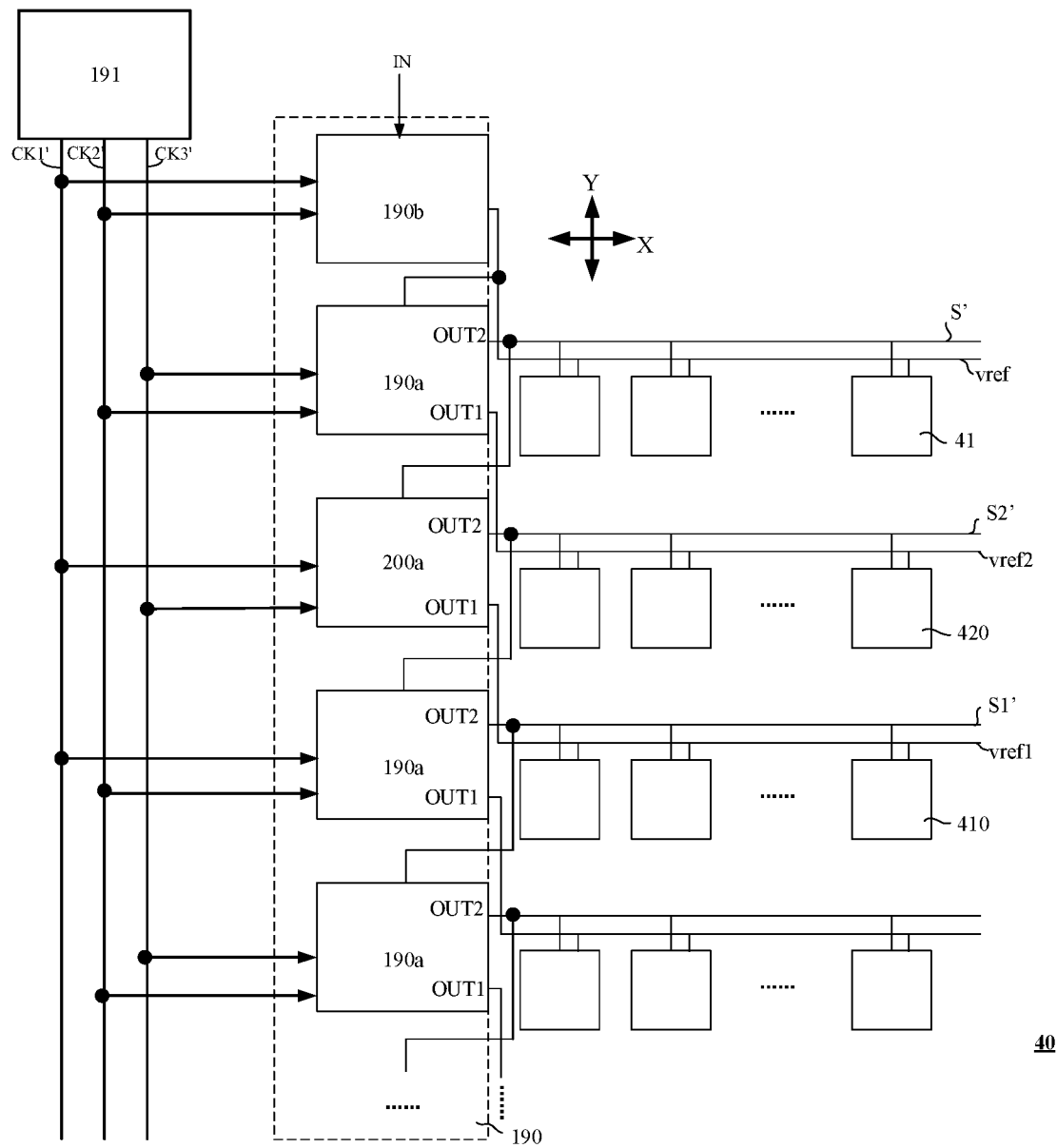
FIG. 26 is a schematic circuit diagram of a first initialization signal output circuit in a display panel according to an embodiment of the present disclosure.

FIG. 26 is a schematic circuit diagram of a first initialization signal output circuit in a display panel according to an embodiment of the present disclosure. As shown in FIG. 26, according to some embodiments of the present disclosure, the first initialization signal output circuit 190 may further include m second shift registers 190b, where m is a positive integer. In some implementations, the second shift register 190b may further be electrically connected to the clock signal terminals CK1' to CK3' of the pulse signal generator 191. The clock signal terminals CK1' to CK3' are configured to provide clock signals for the second shift register 190b. In some implementations, the second shift register 190b at each stage may be electrically connected to two of the clock signal terminals CK1' to CK3', and an adjacent second shift register 190b may be electrically connected to different clock signal terminals from the second shift register 190b at the stage. The m second shift registers 190b are located on a side of the first shift register 190a at the first stage away from the first shift register 190a at the second stage. Output terminals of the m second shift registers 190b may be electrically connected to the m initialization signal lines vref respectively, and each of the m second shift registers 190b is configured to provide the initialization signal to the corresponding initialization signal line vref.

In this way, by providing m second shift registers 190b, it can be ensured that the initialization signal lines vref connected to the pixel circuits in the first m rows may also transmit the initialization signals, and to realize the initialization of the pixel circuits in the first m rows.

It should be noted that, the circuit structure of the second shift register 190b may be the same as or different from that of the first shift register 190a. The second shift register 190b may be configured to output only the initialization signal.

According to other embodiments of the present disclosure, the first initialization signal output circuit 190 may not multiplex the scanning and driving circuit, i.e., the first initialization signal output circuit 190 may not output the scanning signal. In other words, the first initialization signal output circuit 190 may be a separate circuit that outputs the initialization signal.

Figure 27:
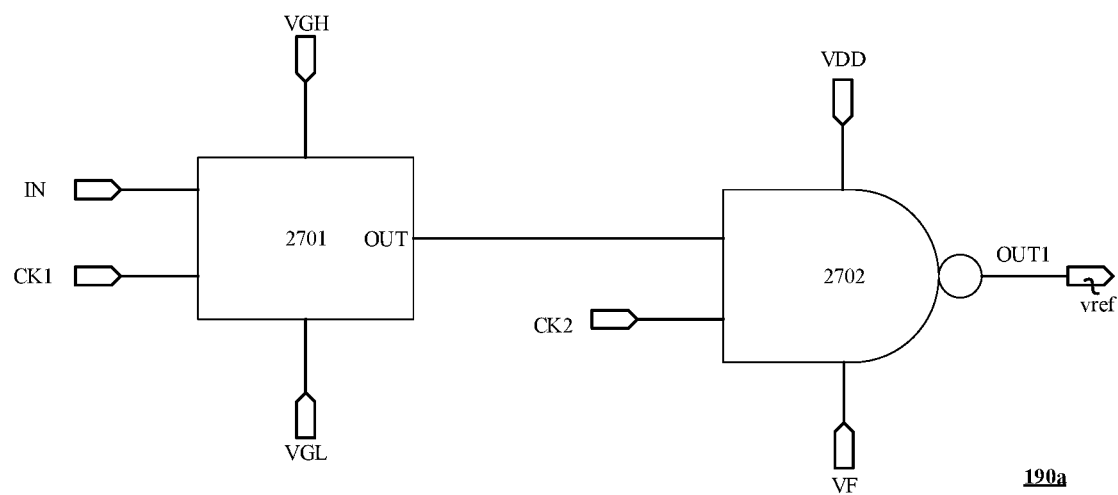
FIG. 27 is a schematic circuit diagram of a first shift register in a display panel according to yet another embodiment of the present disclosure.

FIG. 27 is a schematic circuit diagram of a first shift register in a display panel according to yet another embodiment of the present disclosure. As shown in FIG. 27, according to some embodiments of the present disclosure, the first shift register 190a may include a latch 2701 and a first NAND logic operation device 2702. A clock input terminal of the latch 2701 is electrically connected to the first clock signal line CK1, an input terminal IN of the latch is electrically connected to an output terminal OUT of the latch in the first shift register 190a in the previous stage. A first input terminal of the first NAND logic operation device 2702 is electrically connected to the output terminal OUT of the latch, a second input terminal of the first NAND logic operation device 2702 is electrically connected to the second clock signal line CK2, and an output terminal of the first NAND logic operation device 2702 is the first output terminal OUT1 of the first shift register 190a. The first output terminal OUT1 of the first shift register 190a is electrically connected to the initialization signal line vref. A first level input terminal of the first NAND logic operation device 2702 may be electrically connected to the first positive voltage signal line VDD, and a second level input terminal of the first NAND logic operation device 2702 may be electrically connected to the first negative voltage signal line VF.

The latch 2701 is configured to transmit and latch the signal inputted at the input terminal IN of the latch 2701, and output the signal through the output terminal OUT of the latch 2701. The first NAND logic operation device 2702 outputs the high level of the first positive voltage signal line VDD or the low level of the first negative voltage signal line VF to obtain an initialization signal, under control of a signal obtained through the first NAND logic operation device 2702 performing NAND operation on the signal outputted by the output terminal OUT of the latch 2701 and the signal of the second clock signal line CK2.

In some embodiments, the circuit structure of the output device 200 shown in FIG. 21 and FIG. 22 are similar to the circuit structure shown in FIG. 27, and the output device 200 may also include a latch and a first NAND logic operation device. The output device 200 differs from the output device in FIG. 27 in that, the first level input terminal of the first NAND logic operation device in the output device 200 is electrically connected to the first power supply voltage signal line VGH, and the second level input terminal of the first NAND logic operation device in the output device 200 may be electrically connected to the second power supply voltage signal line VGL.

Figure 28:
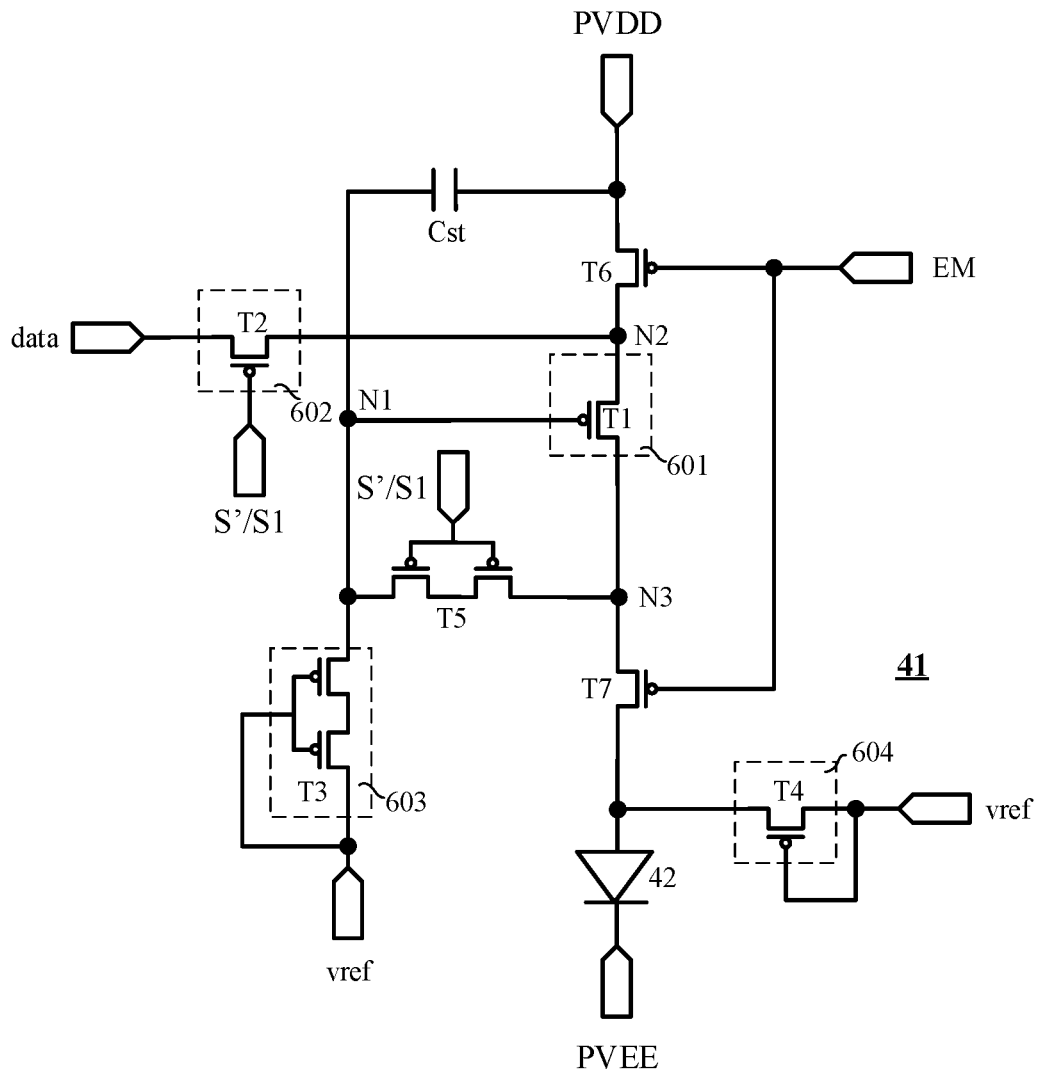
FIG. 28 is a schematic circuit diagram of a pixel circuit in a display panel according to yet another embodiment of the present disclosure.

FIG. 28 is a schematic circuit diagram of a pixel circuit in a display panel according to yet another embodiment of the present disclosure. As shown in FIG. 28, taking the pixel circuit being the 7T1C pixel circuit as an example, the pixel circuit 41 may include a driving device 601, a data writing device 602, a first initialization device 603 and a second initialization device 604. The driving device 601 may include a first transistor T1. The data writing device 602 may include a second transistor T2. The first initialization device 603 may include a third transistor T3. The second initialization device 604 may include a fourth transistor T4. In addition, the pixel circuit 41 may further include a fifth transistor T5, a sixth transistor T6, a seventh transistor T7 and a storage capacitor Cst.

A gate of the first transistor T1 is electrically connected to the first node N1, a first electrode of the first transistor T1 is electrically connected to the second node N2, and a second electrode of the first transistor T1 is electrically connected to the third node N3.

A gate of the second transistor T2 is electrically connected to the scanning signal line S', a first electrode of the second transistor T2 is electrically connected to the data signal line data, and a second electrode of the second transistor T2 is electrically connected to the second node N2.

A gate of the third transistor T3 may be electrically connected to the initialization signal line vref, a first electrode of the third transistor T3 may be electrically connected to the initialization signal line vref, and a second electrode of the third transistor T3 may be electrically connected to the first Node N1.

A gate of the fourth transistor T4 may be electrically connected to the initialization signal line vref, a first electrode of the fourth transistor T4 may be electrically connected to the initialization signal line vref, and a second electrode of the fourth transistor T4 may be electrically connected the first electrode of the light-emitting element 42.

A gate of the fifth transistor T5 is electrically connected to the scanning signal line S', a first electrode of the fifth transistor T5 is electrically connected to the first node N1, and a second electrode of the fifth transistor T5 is electrically connected to the third node N3.

A gate of the sixth transistor T6 is electrically connected to the light-emitting control signal line EM, a first electrode of the sixth transistor T6 is electrically connected to the positive power supply voltage signal line PVDD, and a second electrode of the sixth transistor T6 is electrically connected to the second node N2.

A gate of the seventh transistor T7 is electrically connected to the light-emitting control signal line EM, a first electrode of the seventh transistor T7 is electrically connected to the third node N3, and a second electrode of the seventh transistor T7 is electrically connected to the first electrode of the light-emitting element 42. The second electrode of the light-emitting element 42 is electrically connected to the negative power supply voltage signal line PVEE.

A first plate of the storage capacitor Cst is electrically connected to the positive power supply voltage signal line PVDD, and a second plate of the storage capacitor Cst is electrically connected to the first node N1.

The scanning signal line S' may be the above described first scanning line S1. The scanning signal line S' may be electrically connected to the second transistor T2 and/or the fifth transistor T5 to control data signal writing and/or threshold compensation.

It should be noted that the above circuit structure of the pixel circuit is only for illustration and does not constitute a limitation to the present disclosure. In other embodiments, the pixel circuit may be a 7T2C pixel circuit, an 8T1C pixel circuit, a 9T1C pixel circuit, or other types of pixel circuits.

Figure 29:
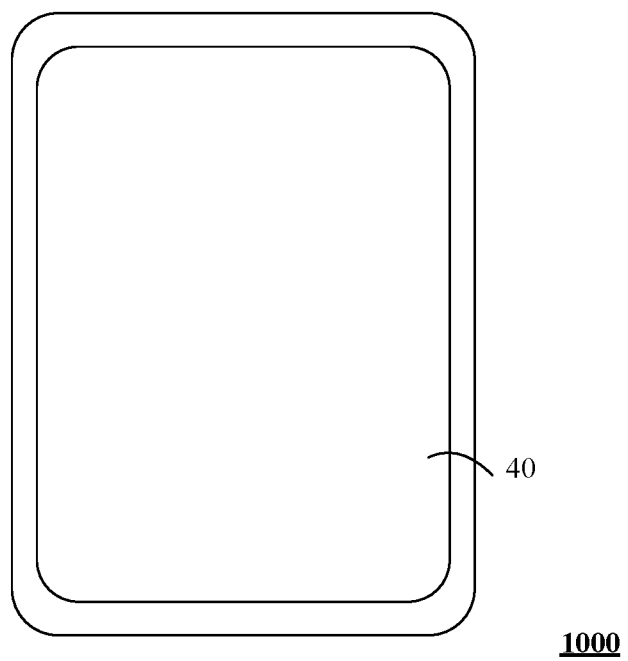
FIG. 29 is a schematic structural diagram of a display device according to an embodiment of the present disclosure.

Based on the display panel according to the above embodiments, correspondingly, a display device is provided according to the present disclosure. The display device includes the display panel provided in the present disclosure. Referring to FIG. 29, FIG. 29 is a schematic structural diagram of a display device according to an embodiment of the present disclosure. The display device 1000 in FIG. 29 includes the display panel 40 provided in any of the above-mentioned embodiments of the present disclosure. The embodiment in FIG. 29 takes a mobile phone as an example to illustrate the display device 1000. It is to be understood that the display device provided by the present disclosure may be a wearable product, a computer, a TV, a vehicle display device, and other display devices with display functions, which is not limited in the present disclosure. The display device provided in the present disclosure has the beneficial effects of the display panel 40 provided in the present disclosure. For details, reference may be made to the specific descriptions of the display panel 40 in the above-mentioned embodiments, and details of which will not be repeated in this embodiment.

It should be understood that the specific structure of the display panel and the specific structure of the circuit provided in the drawings of the present disclosure are only some examples, which are not intended to limit the present disclosure. In addition, the above-mentioned embodiments provided in the present disclosure may be combined with each other if there is no contradiction.

It should be clear that each embodiment in this specification is described in a progressive manner, and the same or similar parts of each embodiment can be referred to each other, and each embodiment focuses on the differences from other embodiments. According to the embodiments of the present disclosure as described above, these embodiments do not describe all details exhaustively, nor do they limit the present disclosure to only the specific embodiments described. It is apparent that various modifications and variations are possible in light of the above description. This description selects and specifically describes these embodiments in order to better explain the principles and practical applications of the present disclosure. The present disclosure is limited only by the claims along with their full scope and equivalents.

The above-mentioned embodiments are illustrative rather than restrictive. Different features in different embodiments can be combined to achieve beneficial effects. Other modified embodiments of the disclosed embodiments on the basis of studying the drawings, specification and claims. In the claims, the term "comprises" does not exclude other structures; a quantity refers to "one" does not exclude multiple; the terms "first" and "second" are used to designate names and not to indicate any specific order. Any reference signs in the claims should not be construed as limiting the scope. The appearance of features in different dependent claims does not mean that these features cannot be combined to obtain beneficial effects.

What is claimed is:

1. A display panel, comprising:
   a pixel circuit and a light-emitting element, wherein the pixel circuit is configured to drive the light-emitting element to emit light; and
   an initialization signal line configured to transmit an initialization signal; wherein
   the initialization signal comprises an enabling level and a non-enabling level, and the enabling level of the initialization signal is configured to initialize a target node of the pixel circuit;
       the initialization signal line extends in a first direction, and further comprises a first initialization signal line and a second initialization signal line; the pixel circuit comprises a plurality of first pixel circuits arranged in the first direction in a first pixel circuit row and a plurality of second pixel circuits arranged in the first direction in a second pixel circuit row; the first initialization signal line is electrically connected to the plurality of first pixel circuits in the first pixel circuit row, the second initialization signal line is electrically connected to the plurality of second pixel circuits in the second pixel circuit row; the first pixel circuit row and the second pixel circuit row are arranged in a second direction; wherein the first direction intersects with the second direction; and
   a screen refresh cycle of the display panel comprises a first stage, wherein the first initialization signal line transmits the enabling level, and the second initialization signal line transmits the non-enabling level, in the first stage.

2. The display panel according to claim 1, wherein the pixel circuit comprises a driving device and a data writing device, a control terminal of the data writing device is electrically connected to a first scanning line, and the first scanning line transmits a scanning signal;
   the screen refresh cycle of the display panel comprises a light-emitting cycle of at least one of the pixel circuit, the light-emitting cycle of the at least one of the pixel circuit comprises an initialization stage and a data writing stage, and the data writing device provides a data signal to the driving device in response to the scanning signal in the data writing stage; and
   the first initialization signal line transmits the enabling level in the initialization stage of each first pixel circuit of the plurality of first pixel circuits, and the first initialization signal line transmits the non-enabling level in the data writing stage of the first pixel circuit.

3. The display panel according to claim 1, wherein the screen refresh cycle of the display panel further comprises a second stage, wherein the first initialization signal line transmits the non-enabling level, and the second initialization signal line transmits the enabling level, in the second stage.

4. The display panel according to claim 2, wherein in a case that each second pixel circuit of the plurality of second pixel circuits is in the initialization stage,
   the data writing device in the first pixel circuit provides the data signal to the driving device in response to the scanning signal, and the second initialization signal line provides the enabling level of the initialization signal to initialize a target node of the second pixel circuit.

5. The display panel according to claim 4, wherein the light-emitting cycle of the at least one of the pixel circuit comprises at least two initialization stages and at least two data writing stages, and the initialization stages and the data writing stages are arranged alternately.

6. The display panel according to claim 1, further comprising:
   a first light-emitting control signal line, wherein the first light-emitting control signal line is electrically connected to each first pixel circuit of the plurality of first pixel circuits, the pixel circuit further comprises a third pixel circuit, the third pixel circuit and the first pixel circuit are arranged in the second direction, and the initialization signal line further comprises a third initialization signal line, the third initialization signal line is electrically connected to the third pixel circuit; and
   a light-emitting cycle of the at least one of the pixel circuit further comprises a light-emitting stage; in the light-emitting stage of the first pixel circuit, the first light-emitting control signal line provides an enabling level, and the third initialization signal line provides the enabling level of the initialization signal to initialize a target node of the third pixel circuit.

7. The display panel according to claim 1, wherein the pixel circuit comprises:
   a driving device, a control terminal of the driving device is electrically connected to a first node;
   a first initialization device, a control terminal of the first initialization device is electrically connected to the initialization signal line, a first terminal of the first initialization device is electrically connected to the initialization signal line, and a second terminal of the first initialization device is electrically connected to the first node; and the first initialization device is configured to transmit the enabling level of the initialization signal provided by the initialization signal line to the first node, to initialize the first node.

8. The display panel according to claim 7, further comprising: a scanning signal line and a reference voltage signal line, wherein the reference voltage signal line is configured to provide a constant voltage signal;
   the pixel circuit further comprises:
       a second initialization device, wherein a control terminal of the second initialization device is electrically connected to the scanning signal line, a first terminal of the second initialization device is electrically connected to the reference voltage signal line, and a second terminal of the second initialization device is electrically connected to a first electrode of the light-emitting element; and the second initialization device is configured to transmit the constant voltage signal provided by the reference voltage signal line to the first electrode of the light-emitting element, to initialize the first electrode of the light-emitting element.

9. The display panel according to claim 7, wherein the pixel circuit further comprises:
a second initialization device, a control terminal of the second initialization device is electrically connected to the initialization signal line, a first terminal of the second initialization device is electrically connected to the initialization signal line, and a second terminal of the second initialization device is electrically connected to a first electrode of the light-emitting element; and the second initialization device is configured to transmit the enabling level of the initialization signal provided by the initialization signal line to the first electrode of the light-emitting element, to initialize the first electrode of the light-emitting element.

10. The display panel according to claim 9, wherein the control terminal of the first initialization device in each first pixel circuit of the plurality of first pixel circuits and the control terminal of the second initialization device in the first pixel circuit are electrically connected to the first initialization signal line; and
the control terminal of the first initialization device in each second pixel circuit of the plurality of second pixel circuits and the control terminal of the second initialization device in the second pixel circuit are electrically connected to the second initialization signal line.

11. The display panel according to claim 9, wherein each first pixel circuit of the plurality of first pixel circuits and each second pixel circuit of the plurality of second pixel circuits are separated by k pixel circuits in the second direction, where k≥0 and k is an integer; and
the control terminal of the first initialization device in the first pixel circuit is electrically connected to the first initialization signal line, and the control terminal of the second initialization device in the first pixel circuit is electrically connected to the second initialization signal line.

12. The display panel according to claim 1, further comprising:
a scanning signal line extends in the first direction, wherein the scanning signal line is electrically connected to the pixel circuit, and the scanning signal line is configured to transmit a scanning signal;
the scanning signal line further comprises a first scanning signal line and a second scanning signal line, the first scanning signal line is electrically connected to each first pixel circuit of the plurality of first pixel circuits, and the second scanning signal line is electrically connected to each second pixel circuit of the plurality of second pixel circuits;
the first pixel circuit is adjacent to the second pixel circuit in the second direction, a phase of a pulse signal provided by the first scanning signal line is the same as a phase of a pulse signal provided by the second initialization signal line, and a period of the pulse signal provided by the first scanning signal line is the same as a period of the pulse signal provided by the second initialization signal line; and in the second direction, a first distance between the first scanning signal line and the first initialization signal line is greater than a second distance between the first scanning signal line and the second initialization signal line.

13. The display panel according to claim 1, further comprising:
an initialization signal output circuit, wherein the initialization signal output circuit comprise a plurality of cascaded first shift registers, a first output terminal of each of the plurality of cascaded first shift registers is electrically connected to one of the initialization signal line, and is configured to provide the initialization signal to the initialization signal line.

14. The display panel according to claim 13, further comprising:
a scanning signal line, wherein the scanning signal line is electrically connected to the pixel circuit; and
each of the plurality of cascaded first shift registers further comprises a second output terminal, the second output terminal of a first shift register is electrically connected to one of the scanning signal line, and is configured to provide a scanning signal to the scanning signal line.

15. The display panel according to claim 14, wherein each first pixel circuit of the plurality of first pixel circuits and each second pixel circuit of the plurality of second pixel circuits are separated by k pixel circuits in the second direction, where k≥0 and k is an integer;
the scanning signal line comprise a first scanning signal line and a second scanning signal line, the first scanning signal line is electrically connected to the first pixel circuit, and the second scanning signal line is electrically connected to the second pixel circuit; and
the plurality of cascaded first shift registers comprises a first target shift register, a first output terminal of the first target shift register is electrically connected to the first initialization signal line, and a second output terminal of the first target shift register is electrically connected to the second scanning signal line.

16. The display panel according to claim 15, wherein each of the plurality of cascaded first shift registers comprises a first inverter and a second inverter;
a control terminal of the first inverter is electrically connected to the second output terminal of the first shift register, a first input terminal of the first inverter is electrically connected to a first power supply voltage signal line, and a second input terminal of the first inverter is electrically connected to a second power supply voltage signal line, and an output terminal of the first inverter is electrically connected to a control terminal of the second inverter; and
a first input terminal of the second inverter is electrically connected to a first positive voltage signal line, a second input terminal of the second inverter is electrically connected to a first negative voltage signal line, and an output terminal of the second inverter is the first output terminal of the first shift register.

17. The display panel according to claim 15, wherein the each of the plurality of cascaded first shift registers comprises:
a third inverter, wherein a control terminal of the third inverter is electrically connected to a second connection node, a first input terminal of the third inverter is electrically connected to a first power supply voltage signal line, and a second input terminal of the third inverter is electrically connected to a second power supply voltage signal line;

a fourth inverter, wherein a control terminal of the fourth inverter is electrically connected to an output terminal of the third inverter, a first input terminal of the fourth inverter is electrically connected to the first power supply voltage signal line, a second input terminal of the fourth inverter is electrically connected to the second power supply voltage signal line, an output terminal of the fourth inverter is the second output terminal of the first shift register, and the second output terminal of the first shift register is electrically connected to one of the scanning signal line to provide the scanning signal to the pixel circuit through the scanning signal line; and a fifth inverter, wherein a control terminal of the fifth inverter is electrically connected to the output terminal of the third inverter, and a first input terminal of the fifth inverter is electrically connected to a first positive voltage signal line, a second input terminal of the fifth inverter is electrically connected to a first negative voltage signal line, and an output terminal of the fifth inverter is the first output terminal of the first shift register.

18. The display panel according to claim 13, wherein each of the plurality of cascaded first shift registers comprises:

a latch, wherein a clock input terminal of the latch is electrically connected to a first clock signal line, and an input terminal of the latch is electrically connected to an output terminal of the latch of a first shift register in a previous stage;

a first NAND logic operation device, wherein a first input terminal of the first NAND logic operation device is electrically connected to an output terminal of the latch, and a second input terminal of the first NAND logic operation device is electrically connected to a second clock signal line, an output terminal of the first NAND logic operation device is the first output terminal of the first shift register, and the first output terminal of the first shift register is electrically connected to the first initialization signal line.

19. The display panel according to claim 14, wherein, the first initialization signal output circuit further comprises m second shift registers, where m is a positive integer, and the m second shift registers are located on a side of the first shift register at a first stage away from the first shift register at a second stage; output terminals of the m second shift registers are electrically connected to m initialization signal lines respectively, and each of the m second shift registers is configured to provide an initialization signal to a corresponding initialization signal line.

20. A display device comprising a display panel, wherein the display panel comprises:

a pixel circuit and a light-emitting element, wherein the pixel circuit is configured to drive the light-emitting element to emit light; and an initialization signal line configured to transmit an initialization signal; wherein the initialization signal comprises an enabling level and a non-enabling level, and the enabling level of the initialization signal is configured to initialize a target node of the pixel circuit;

the initialization signal line extends in a first direction, and further comprises a first initialization signal line and a second initialization signal line; the pixel circuit comprises a plurality of first pixel circuits arranged in the first direction in a first pixel circuit row and a plurality of second pixel circuits arranged in the first direction in a second pixel circuit row; the first initialization signal line is electrically connected to the plurality of first pixel circuits in the first pixel circuit row, the second initialization signal line is electrically connected to the plurality of second pixel circuits in the second pixel circuit row; the first pixel circuit row and the second pixel circuit row are arranged in a second direction; wherein the first direction intersects with the second direction; and a screen refresh cycle of the display panel comprises a first stage, wherein the first initialization signal line transmits the enabling level, and the second initialization signal line transmits the non-enabling level, in the first stage.

\* \* \* \* \*